(12) United States Patent
Radovanovic et al.

(10) Patent No.: US 10,101,050 B2
(45) Date of Patent: Oct. 16, 2018

(54) DISPATCH ENGINE FOR OPTIMIZING DEMAND-RESPONSE THERMOSTAT EVENTS

(71) Applicant: Google LLC, Mountain View, CA (US)

(72) Inventors: Ana Radovanovic, Palo Alto, CA (US); William Dow Heavlin, El Granada, CA (US); Wolf-Dietrich Weber, San Jose, CA (US); Ankit Somani, Sunnyvale, CA (US); Seungil You, San Jose, CA (US); Matthew Wytock, San Jose, CA (US)

(73) Assignee: Google LLC, Mountain View, CA (US)

( * ) Notice: Subject to any disclaimer, the term of this patent is extended or adjusted under 35 U.S.C. 154(b) by 90 days.

(21) Appl. No.: 15/374,552

(22) Filed: Dec. 9, 2016

(65) Prior Publication Data

US 2017/0167742 A1    Jun. 15, 2017

Related U.S. Application Data

(60) Provisional application No. 62/265,326, filed on Dec. 9, 2015.

(51) Int. Cl.
*G05B 15/00* (2006.01)
*F24F 11/00* (2018.01)
(Continued)

(52) U.S. Cl.
CPC .......... *F24F 11/0012* (2013.01); *F24F 11/30* (2018.01); *F24F 11/62* (2018.01);
(Continued)

(58) Field of Classification Search
CPC ..... G05B 11/0012; G05B 13/04; G06F 17/18; G06F 11/00; F24F 11/00; F24F 11/0012
See application file for complete search history.

(56) References Cited

U.S. PATENT DOCUMENTS

| 4,223,831 A | 9/1980 | Szarka |
| 4,335,847 A | 6/1982 | Levine |

(Continued)

FOREIGN PATENT DOCUMENTS

| CA | 2202008 C | 2/2000 |
| CN | 102375443 A | 3/2012 |

(Continued)

OTHER PUBLICATIONS

International Search Report and Written Opinion dated Oct. 9, 2014 for International Patent Application No. PCT/US2014/027185 filed Mar. 14, 2014, all pages.

(Continued)

*Primary Examiner* — Vincent Tran
(74) *Attorney, Agent, or Firm* — Kilpatrick Townsend & Stockton LLP

(57) ABSTRACT

A thermostat management server may include one or more processors and one or more memory devices comprising instructions that, when executed by the one or more processors, cause the one or more processors to perform operations comprising receiving information that characterizes energy usage associated with the plurality of thermostats, receiving parameters characterizing proposed future demand-response events, selecting a combination of thermostats from the plurality of thermostats for which the energy usage can be reduced, simulating a demand response event based on the parameters and using different weather conditions for the combination of the plurality of thermostats, generating statistical probabilities of meeting a plurality of capacity reduction levels based on the different weather conditions, selecting a capacity reduction level from the plurality of capacity reduction levels based on the statistical probabilities, and sending the capacity reduction level to the utility provider computer system.

20 Claims, 20 Drawing Sheets

(51) Int. Cl.
   *G05B 15/02*   (2006.01)
   *F24F 11/30*   (2018.01)
   *F24F 11/62*   (2018.01)
   *F24F 11/70*   (2018.01)
   *F24F 110/10*  (2018.01)
   *F24F 120/10*  (2018.01)
   *F24F 140/50*  (2018.01)
   *F24F 140/60*  (2018.01)
   *F24F 130/00*  (2018.01)
   *F24F 130/10*  (2018.01)
   *F24F 11/63*   (2018.01)
   *F24F 11/65*   (2018.01)
   *F24F 11/58*   (2018.01)
   *F24F 11/46*   (2018.01)
   *F24F 11/52*   (2018.01)

(52) U.S. Cl.
   CPC ............. *F24F 11/70* (2018.01); *G05B 15/02* (2013.01); *F24F 11/46* (2018.01); *F24F 11/52* (2018.01); *F24F 11/58* (2018.01); *F24F 11/63* (2018.01); *F24F 11/65* (2018.01); *F24F 2110/10* (2018.01); *F24F 2120/10* (2018.01); *F24F 2130/00* (2018.01); *F24F 2130/10* (2018.01); *F24F 2140/50* (2018.01); *F24F 2140/60* (2018.01); *G05B 2219/2642* (2013.01)

(56) References Cited

U.S. PATENT DOCUMENTS

| | | |
|---|---|---|
| 4,408,711 A | 10/1983 | Levine |
| 4,615,380 A | 10/1986 | Beckey |
| 4,674,027 A | 6/1987 | Beckey |
| 4,685,614 A | 8/1987 | Levine |
| 4,751,961 A | 6/1988 | Levine et al. |
| 4,847,781 A | 7/1989 | Brown, III et al. |
| 5,088,645 A | 2/1992 | Bell |
| 5,211,332 A | 5/1993 | Adams |
| 5,240,178 A | 8/1993 | Dewolf et al. |
| 5,395,042 A | 3/1995 | Riley et al. |
| 5,462,225 A | 10/1995 | Massara et al. |
| 5,476,221 A | 12/1995 | Seymour |
| 5,499,196 A | 3/1996 | Pacheco |
| 5,544,036 A | 8/1996 | Brown, Jr. et al. |
| 5,555,927 A | 9/1996 | Shah |
| 5,611,484 A | 3/1997 | Uhrich |
| 5,761,083 A | 6/1998 | Brown, Jr. et al. |
| 5,816,491 A | 10/1998 | Berkeley et al. |
| 5,902,183 A | 5/1999 | D'Souza |
| 5,909,378 A | 6/1999 | De Milleville |
| 5,977,964 A | 11/1999 | Williams et al. |
| 6,062,482 A | 5/2000 | Gauthier et al. |
| 6,098,893 A | 8/2000 | Berglund et al. |
| 6,122,603 A | 9/2000 | Budike, Jr. |
| 6,216,956 B1 | 4/2001 | Ehlers et al. |
| 6,311,105 B1 | 10/2001 | Budike, Jr. |
| 6,349,883 B1 | 2/2002 | Simmons et al. |
| 6,356,204 B1 | 3/2002 | Guindi et al. |
| 6,574,581 B1 | 6/2003 | Bohrer et al. |
| 6,643,567 B2 | 11/2003 | Kolk et al. |
| 6,645,066 B2 | 11/2003 | Gutta et al. |
| 6,769,482 B2 | 8/2004 | Wagner et al. |
| 6,785,630 B2 | 8/2004 | Kolk et al. |
| 6,975,958 B2 | 12/2005 | Bohrer et al. |
| 7,024,336 B2 | 4/2006 | Salsbury et al. |
| 7,333,880 B2 | 2/2008 | Brewster et al. |
| 7,346,467 B2 | 3/2008 | Bohrer et al. |
| RE40,437 E | 7/2008 | Rosen |
| 7,469,550 B2 | 12/2008 | Chapman, Jr. et al. |
| 7,644,869 B2 | 1/2010 | Hoglund et al. |
| 7,702,424 B2 | 4/2010 | Cannon et al. |
| 7,784,704 B2 | 8/2010 | Harter |
| 7,802,618 B2 | 9/2010 | Simon et al. |
| 7,848,900 B2 | 12/2010 | Steinberg et al. |
| 7,854,389 B2 | 12/2010 | Ahmed |
| 7,908,116 B2 | 3/2011 | Steinberg et al. |
| 7,908,117 B2 | 3/2011 | Steinberg et al. |
| 8,010,237 B2 | 8/2011 | Cheung et al. |
| 8,019,567 B2 | 9/2011 | Steinberg et al. |
| 8,090,477 B1 | 1/2012 | Steinberg |
| 8,131,497 B2 | 3/2012 | Steinberg et al. |
| 8,131,506 B2 | 3/2012 | Steinberg et al. |
| 8,180,492 B2 | 5/2012 | Steinberg |
| 8,521,336 B2 * | 8/2013 | Paik .................... H02J 3/14 700/22 |
| 2003/0216838 A1 | 11/2003 | Dudley |
| 2004/0034484 A1 | 2/2004 | Solomita, Jr. et al. |
| 2004/0249479 A1 | 12/2004 | Shorrock |
| 2005/0119793 A1 | 6/2005 | Amundson et al. |
| 2005/0128067 A1 | 6/2005 | Zakrewski |
| 2005/0189429 A1 | 9/2005 | Breeden |
| 2005/0280421 A1 | 12/2005 | Yomoda et al. |
| 2006/0186214 A1 | 8/2006 | Simon et al. |
| 2006/0196953 A1 | 9/2006 | Simon et al. |
| 2007/0045431 A1 | 3/2007 | Chapman, Jr. et al. |
| 2007/0241203 A1 | 10/2007 | Wagner et al. |
| 2008/0015740 A1 | 1/2008 | Osann |
| 2008/0015742 A1 | 1/2008 | Kulyk et al. |
| 2008/0191045 A1 | 8/2008 | Harter |
| 2008/0317292 A1 | 12/2008 | Baker et al. |
| 2009/0048718 A1 * | 2/2009 | Richard .......... G06Q 10/06312 700/296 |
| 2009/0050703 A1 | 2/2009 | Lifson et al. |
| 2009/0125151 A1 | 5/2009 | Steinberg et al. |
| 2009/0171862 A1 | 7/2009 | Harrod et al. |
| 2009/0254225 A1 | 10/2009 | Boucher |
| 2009/0259713 A1 | 10/2009 | Blumrich et al. |
| 2009/0326726 A1 | 12/2009 | Ippolito et al. |
| 2010/0019051 A1 | 1/2010 | Rosen |
| 2010/0025483 A1 | 2/2010 | Hoeynck et al. |
| 2010/0070084 A1 | 3/2010 | Steinberg et al. |
| 2010/0070086 A1 | 3/2010 | Harrod et al. |
| 2010/0070234 A1 | 3/2010 | Steinberg et al. |
| 2010/0084482 A1 | 4/2010 | Kennedy et al. |
| 2010/0088261 A1 | 4/2010 | Montalvo |
| 2010/0107109 A1 | 4/2010 | Filbeck |
| 2010/0211224 A1 | 8/2010 | Keeling et al. |
| 2010/0262298 A1 | 10/2010 | Johnson et al. |
| 2010/0262299 A1 | 10/2010 | Cheung et al. |
| 2010/0280667 A1 | 11/2010 | Steinberg |
| 2010/0282857 A1 | 11/2010 | Steinberg |
| 2010/0289643 A1 | 11/2010 | Trundle et al. |
| 2010/0308119 A1 | 12/2010 | Steinberg et al. |
| 2010/0318227 A1 | 12/2010 | Steinberg et al. |
| 2011/0015797 A1 | 1/2011 | Gilstrap |
| 2011/0015798 A1 | 1/2011 | Golden et al. |
| 2011/0015802 A1 | 1/2011 | Imes |
| 2011/0022242 A1 | 1/2011 | Bukhin et al. |
| 2011/0046792 A1 | 2/2011 | Imes et al. |
| 2011/0046805 A1 | 2/2011 | Bedros et al. |
| 2011/0046806 A1 | 2/2011 | Nagel et al. |
| 2011/0066300 A1 | 3/2011 | Tyagi |
| 2011/0077896 A1 | 3/2011 | Steinberg et al. |
| 2011/0106328 A1 | 5/2011 | Zhou et al. |
| 2011/0166828 A1 | 7/2011 | Steinberg et al. |
| 2011/0184565 A1 | 7/2011 | Peterson |
| 2011/0184574 A1 * | 7/2011 | Le Roux ............... G01D 4/004 700/291 |
| 2011/0185895 A1 | 8/2011 | Freen |
| 2011/0231028 A1 | 9/2011 | Ozog |
| 2011/0264291 A1 | 10/2011 | Le Roux et al. |
| 2011/0290893 A1 | 12/2011 | Steinberg |
| 2011/0307103 A1 | 12/2011 | Cheung et al. |
| 2012/0016524 A1 * | 1/2012 | Spicer ................... G05B 15/02 700/276 |
| 2012/0029713 A1 | 2/2012 | Spicer |
| 2012/0046859 A1 | 2/2012 | Imes et al. |
| 2012/0053745 A1 | 3/2012 | Ng |
| 2012/0064923 A1 | 3/2012 | Imes et al. |
| 2012/0065805 A1 * | 3/2012 | Montalvo ............. G06Q 10/06 700/297 |
| 2012/0065935 A1 | 3/2012 | Steinberg et al. |

(56) References Cited

U.S. PATENT DOCUMENTS

| | | | |
|---|---|---|---|
| 2012/0085831 A1 | 4/2012 | Kopp | |
| 2012/0086562 A1 | 4/2012 | Steinberg | |
| 2012/0089523 A1 | 4/2012 | Hurri et al. | |
| 2012/0091804 A1 | 4/2012 | Altonen et al. | |
| 2012/0095601 A1 | 4/2012 | Abraham et al. | |
| 2012/0101648 A1 | 4/2012 | Federspiel et al. | |
| 2012/0118989 A1 | 5/2012 | Buescher et al. | |
| 2012/0136496 A1* | 5/2012 | Black | H02J 3/14 700/291 |
| 2012/0158350 A1 | 6/2012 | Steinberg et al. | |
| 2012/0191257 A1 | 7/2012 | Corcoran et al. | |
| 2012/0221151 A1 | 8/2012 | Steinberg | |
| 2012/0259469 A1 | 10/2012 | Ward et al. | |
| 2012/0296480 A1 | 11/2012 | Raman | |
| 2012/0310431 A1 | 12/2012 | Cheetham | |
| 2013/0015703 A1* | 1/2013 | Rouse | H02J 3/38 307/18 |
| 2013/0024799 A1 | 1/2013 | Fadell et al. | |
| 2013/0030590 A1 | 1/2013 | Prosser | |
| 2013/0085614 A1 | 4/2013 | Wenzel et al. | |
| 2013/0274936 A1 | 10/2013 | Donahue | |
| 2014/0316598 A1* | 10/2014 | Yang | H02J 3/14 700/295 |
| 2015/0094968 A1* | 4/2015 | Jia | G06Q 40/04 702/60 |
| 2015/0346741 A1* | 12/2015 | Murthy | G05B 15/02 700/276 |

FOREIGN PATENT DOCUMENTS

| | | |
|---|---|---|
| CN | 102812303 A | 12/2012 |
| EP | 196069 B1 | 12/1991 |
| EP | 2378483 A1 | 10/2011 |
| EP | 2407837 A2 | 1/2012 |
| JP | 59106311 A | 6/1984 |
| JP | 01252850 A | 10/1989 |
| WO | 2010033563 A1 | 3/2010 |
| WO | 2011149600 A2 | 12/2011 |
| WO | 2012024534 A2 | 2/2012 |
| WO | 2012/092625 | 7/2012 |
| WO | 2014/149993 | 9/2014 |
| WO | 2014/152301 | 9/2014 |
| WO | 2014/172374 | 10/2014 |

OTHER PUBLICATIONS

International Preliminary Report on Patentability dated Sep. 15, 2015 for International Patent Application No. PCT/US2014/027185 filed Mar. 14, 2014, all pages.
International Search Report and Written Opinion dated Jul. 30, 2014 for International Patent Application No. PCT/US2014/021758 filed Mar. 7, 2014, all pages.
International Preliminary Report on Patentability dated Sep. 15, 2015 for International Patent Application No. PCT/US2014/021758 filed Mar. 7, 2014, all pages.
International Search Report and Written Opinion dated Sep. 15, 2014 for International Patent Application No. PCT/US2014/034213 filed Apr. 15, 2014, all pages.
International Preliminary Report on Patentability dated Oct. 20, 2015 for International Patent Application No. PCT/US2014/034213 filed Apr. 15, 2014, all pages.
Yang, Xiaoping "Study on Optimization Control Technique of Heating, Ventilation and Air-conditioning," Chinese Doctoral Dissertations & Master's Theses Full-text Database (Master), Engineering Science and Technology II, No. 5, C038-269.
First Chinese Office Action dated Aug. 24, 2016, for Chinese Patent Application No. 201480029063.8, 23 pages. English translation.
EP Patent Application No. 14770648.5 filed Mar. 14, 2014, Extended European Search Report dated Oct. 12, 2016, all pages.
EP Patent Application No. 14784686.9 filed Apr. 15, 2014, Extended European Search Report dated Nov. 25, 2016, all pages.
EP Patent Application No. 14767804.9 filed Mar. 7, 2014 Extended European Search Report dated Jan. 5, 2017, all pages.
Aprilaire Electronic Thermostats Model 8355 User's Manual, Research Products Corporation, Dec. 2000, 16 pages.
Braeburn 5300 Installer Guide, Braeburn Systems, LLC, Dec. 9, 2009, 10 pages.
Braeburn Model 5200, Braeburn Systems, LLC, Jul. 20, 2011, 11 pages.
Ecobee Smart Si Thermostat Installation Manual, Ecobee, Apr. 3, 2012, 40 pages.
Ecobee Smart Si Thermostat User Manual, Ecobee, Apr. 3, 2012, 44 pages.
Ecobee Smart Thermostat Installation Manual, Jun. 29, 2011, 20 pages.
Ecobee Smart Thermostat User Manual, May 11, 2010, 20 pages.
Electric Heat Lock Out on Heat Pumps, Washington State University Extension Energy Program, Apr. 2010, pp. 1-3.
Honeywell Installation Guide FocusPRO TH6000 Series, Honeywell International, Inc., Jan. 5, 2012, 24 pages.
Honeywell Operating Manual FocusPRO TH6000 Series, Honeywell International, Inc., Mar. 25, 2011, 80 pages.
Honeywell Prestige IAQ Product Data 2, Honeywell International, Inc., Jan. 12, 2012, 126 pages.
Honeywell Prestige THX9321 and TXH9421 Product Data, Honeywell International, Inc., 68-0311, Jan. 2012, 126 pages.
Honeywell Prestige THX9321-9421 Operating Manual, Honeywell International, Inc., Jul. 6, 2011, 120 pages.
Hunter Internet Thermostat Installation Guide, Hunter Fan Co., Aug. 14, 2012, 8 pages.
Introducing the New Smart Si Thermostat, Datasheet [online]. Ecobee, Mar. 2012 [retrieved on Feb. 25, 2013]. Retrieved from the Internet: <URL: https://www.ecobee.com/solutions/home/smart-si/ >, Mar. 12, 2012, 4 pages.
Lennox ComfortSense 5000 Owners Guide, Lennox Industries, Inc., Feb. 2008, 32 pages.
Lennox ComfortSense 7000 Owners Guide, Lennox Industries, Inc., May 2009, 15 pages.
Lennox iComfort Manual, Lennox Industries, Inc., Dec. 2010, 20 pages.
Lux PSPU732T Manual, LUX Products Corporation, Jan. 6, 2009, 48 pages.
NetX RP32-WIFI Network Thermostat Consumer Brochure, Network Thermostat, May 2011, 2 pages.
NetX RP32-WIFI Network Thermostat Specification Sheet, Network Thermostat, Feb. 28, 2012, 2 pages.
RobertShaw Product Manual 9620, Maple Chase Company, Jun. 12, 2001, 14 pages.
RobertShaw Product Manual 9825i2, Maple Chase Company, Jul. 17, 2006, 36 pages.
SYSTXCCUIZ01-V Infinity Control Installation Instructions, Carrier Corp, May 31, 2012, 20 pages.
T8611G Chronotherm IV Deluxe Programmable Heat Pump Thermostat Product Data, Honeywell International Inc., Oct. 1997, 24 pages.
TB-PAC, TB-PHP, Base Series Programmable Thermostats, Carrier Corp, May 14, 2012, 8 pages.
The Perfect Climate Comfort Center PC8900A W8900A-C Product Data Sheet, Honeywell International Inc., Apr. 2001, 44 pages.
TP-PAC, TP-PHP, TP-NAC, TP-NHP Performance Series AC/HP Thermostat Installation Instructions, Carrier Corp, Sep. 2007, 56 pages.
Trane Communicating Thermostats for Fan Coil, Trane, May 2011, 32 pages.
Trane Communicating Thermostats for Heat Pump Control, Trane, May 2011, 32 pages.
Trane Install XL600 Installation Manual, Trane, Mar. 2006, 16 pages.
Trane XL950 Installation Guide, Trane, Mar. 2011, 20 pages.
Venstar T2900 Manual, Venstar, Inc., Apr. 2008, 113 pages.
Venstar T5800 Manual, Venstar, Inc., Sep. 7, 2011, 63 pages.
VisionPRO TH8000 Series Installation Guide, Honeywell International, Inc., Jan. 2012, 12 pages.

(56) References Cited

OTHER PUBLICATIONS

VisionPRO TH8000 Series Operating Manual, Honeywell International, Inc., Mar. 2011, 96 pages.
VisionPRO Wi-Fi Programmable Thermostat, Honeywell International, Inc., Operating Manual, Aug. 2012, 48 pages.
White Rodgers (Emerson) Model 1F81-261 Installation and Operating Instructions, White Rodgers, Apr. 15, 2010, 8 pages.
White Rodgers (Emerson) Model IF98EZ-1621 Homeowner's User Guide, White Rodgers, Jan. 25, 2012, 28 pages.
Akhlaghinia et al., "Occupancy Monitoring in Intelligent Environment through Integrated Wireless Localizing Agents", IEEE, 2009, 7 pages.
Akhlaghinia et al., "Occupant Behaviour Prediction in Ambient Intelligence Computing Environment", Journal of Uncertain Systems, vol. 2, No. 2, 2008, pp. 85-100.
Allen et al., "Real-Time Earthquake Detection and Hazard Assessment by ElarmS Across California", Geophysical Research Letters, vol. 36, L00B08, 2009, pp. 1-6.
Chatzigiannakis et al., "Priority Based Adaptive Coordination of Wireless Sensors and Actors", [online] Q2SWinet '06, Oct. 2, 2006 [Retrieved on Mar. 12, 2012]. Retrieved from the Internet: <URL: http://dl.acm.org/citation.cfm?id=1163681>.
Deleeuw, "Ecobee WiFi Enabled Smart Thermostat Part 2: The Features Review", Retrieved from <URL: http://www.homenetworkenabled.com/content.php?136-ecobee-WiFi-enabled-Smart-Thermostat-Part-2-The-Features-review>, Dec. 2, 2011, 5 pages.
Gao et al., "The Self-Programming Thermostat: Optimizing Setback Schedules Based on Home Occupancy Patterns", In Proceedings of the First ACM Workshop on Embedded Sensing Systems for Energy-Efficiency in Buildings, Nov. 3, 2009, 6 pages.
Loisos et al., "Buildings End-Use Energy Efficiency: Alternatives to Compressor Cooling", California Energy Commission, Public Interest Energy Research, Jan. 2000, 80 pages.
Lu et al., "The Smart Thermostat: Using Occupancy Sensors to Save Energy in Homes", In Proceedings of the 8th ACM Conference on Embedded Networked Sensor Systems, Nov. 3-5, 2010, pp. 211-224.
Mozer, "The Neural Network House: An Environmental that Adapts to its Inhabitants", AAAI Technical Report SS-98-02, 1998, pp. 110-114.
Ros et al., "Multi-Sensor Human Tracking with the Bayesian Occupancy Filter", IEEE, 2009, 8 pages.
Wong et al., "Maximum Likelihood Estimation of ARMA Model with Error Processes for Replicated Observations", National University of Singapore, Department of Economics, Working Paper No. 0217, 2002, 19 pages.
Lien et al., "Remote-Controllable Power Outlet System for Home Power Management", IEEE, Nov. 2007, pp. 1634-1641.
Arens et al., "Demand Response Electrical Appliance Manager-User Interface Design, Development and Testing",Poster, Demand Response Enabling Technology Development, University of California Berkeley, Retrieved from dr.berkeley.edu/dream/posters/2005_6GUiposter.pdf, 2005, 1 page.
Arens et al., "Demand Response Enabled Thermostat-Control Strategies and Interface", Demand Response Enabling Technology Development Poster, University of California Berkeley, Retrieved from dr.berkeley.edu/dream/posters/2004_11 CEC TstatPoster.pdf, 2004, 1 page.
Arens et al., "Demand Response Enabling Technology Development", Phase I Report: Jun. 2003-Nov. 2005, Jul. 27, P:/DemandRes/UC Papers/DR-Phase1 Report-Final Draf!April24-26.doc, University of California Berkeley, pp. 1-108.
Arens et al., "New Thermostat Demand Response Enabling Technology", Poster, University of California Berkeley, Jun. 10, 2004.

\* cited by examiner

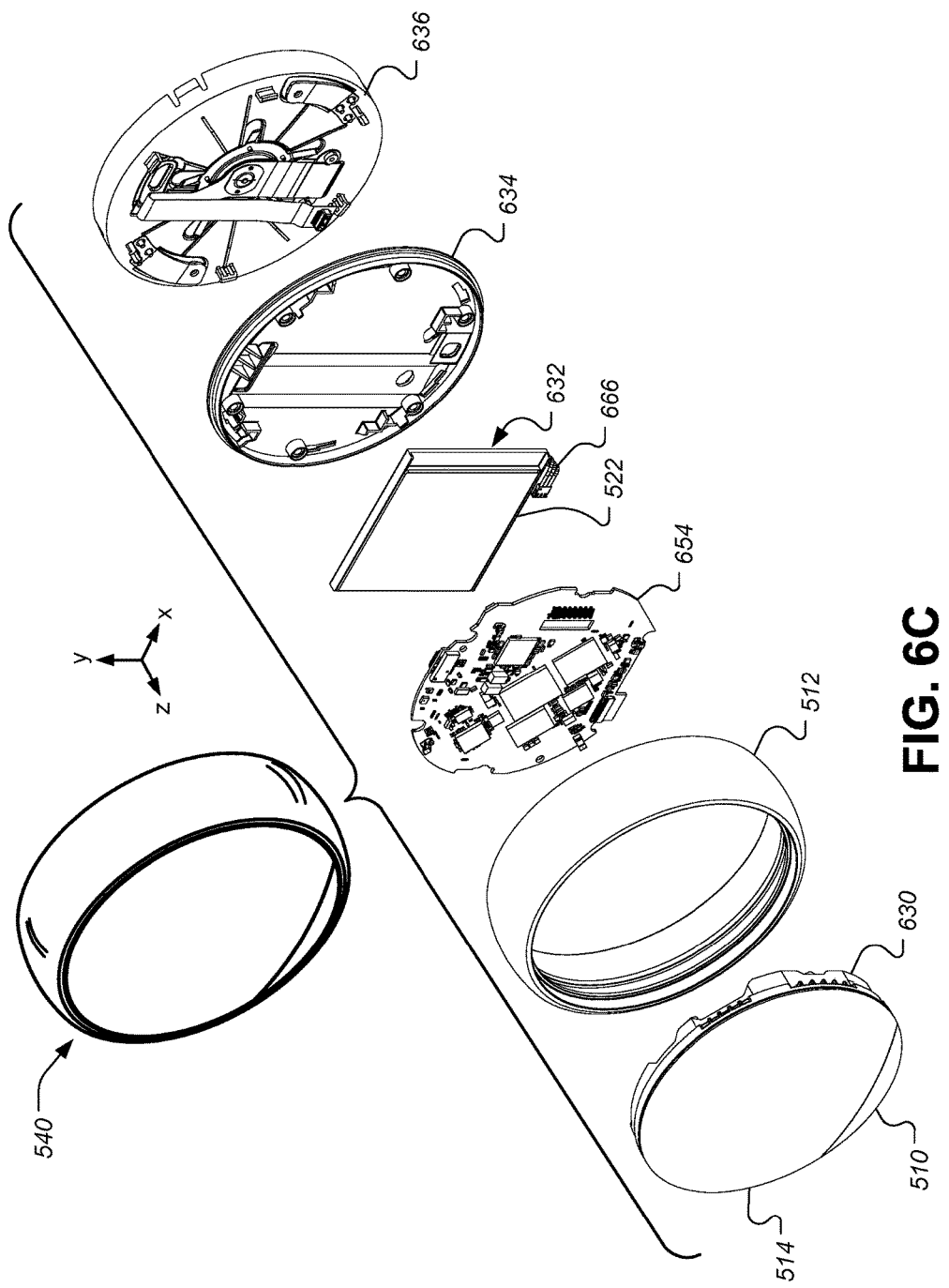

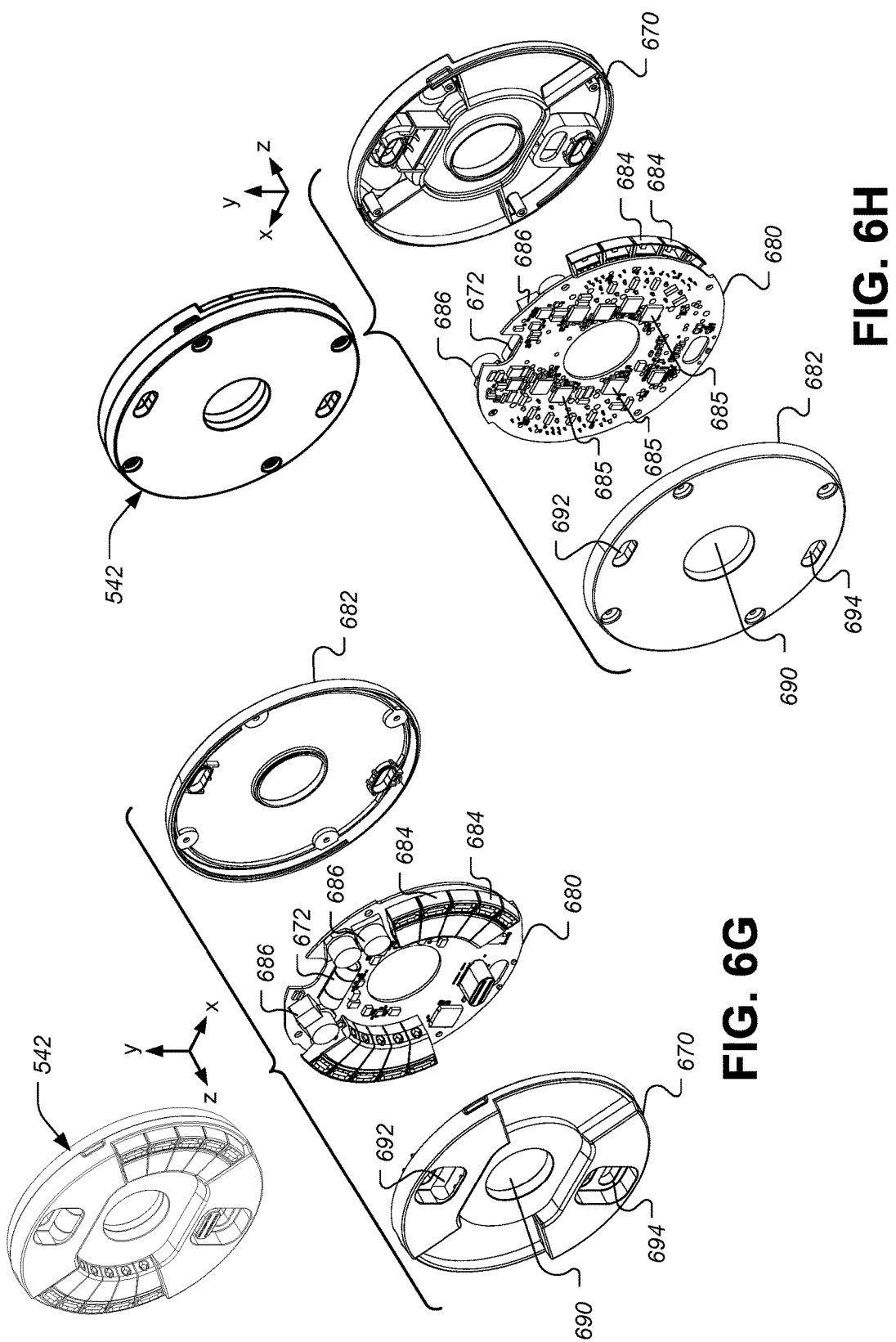

DISPATCH ENGINE FOR OPTIMIZING DEMAND-RESPONSE THERMOSTAT EVENTS

CROSS-REFERENCES TO RELATED APPLICATIONS

This application claims the benefit of U.S. Provisional Application No. 62/265,326 filed on Dec. 9, 2015, which is incorporated herein by reference.

BACKGROUND

Microprocessor controlled "smart" thermostats may have advanced environmental control capabilities that can save energy while also keeping occupants comfortable. To do this, these smart thermostats require more information from the occupants as well as the environments where the thermostats are located. These thermostats may also be capable of connection to computer networks, including both local area networks (or other "private" networks) and wide area networks such as the Internet (or other "public" networks), in order to obtain current and forecasted outside weather data, cooperate in so-called demand-response programs (e.g., automatic conformance with power alerts that may be issued by utility companies during periods of extreme weather), enable users to have remote access and/or control thereof through their network-connected device (e.g., smartphone, tablet computer, PC-based web browser), and other advanced functionalities. Of particular importance is the ability to accurately assess the state of occupancy of a home and to provide a meaningful, yet simple user interface for responding to user inputs.

BRIEF SUMMARY

In some embodiments, a thermostat management server comprising may include one or more processors and one or more memory devices including instructions that, when executed by the one or more processors, cause the one or more processors to perform operations including receiving, from a plurality of thermostats, information that characterizes energy usage associated with the plurality of thermostats. The operations may also include receiving, from a utility provider computer system, parameters characterizing proposed future demand-response events, and selecting a combination of thermostats from the plurality of thermostats for which the energy usage can be reduced. The operations may additionally include simulating a demand response event based on the parameters and using different weather conditions for the combination of the plurality of thermostats, and generating statistical probabilities of meeting a plurality of capacity reduction levels based on the different weather conditions. The operations may further include selecting a capacity reduction level from the plurality of capacity reduction levels based on the statistical probabilities, and sending the capacity reduction level to the utility provider computer system.

In some embodiments, a method for responding to requests to fulfill future power capacity reductions may include receiving, from a plurality of thermostats, information that characterizes energy usage associated with the plurality of thermostats, and receiving, from a utility provider computer system, parameters characterizing proposed future demand-response events. The method may also include selecting, by a thermostat management server, a combination of thermostats from the plurality of thermostats for which the energy usage can be reduced, and simulating, by the thermostat management server, a demand response event based on the parameters and using different weather conditions for the combination of the plurality of thermostats. The method may additionally include generating, by the thermostat management server, statistical probabilities of meeting a plurality of capacity reduction levels based on the different weather conditions, and selecting, by the thermostat management server, a capacity reduction level from the plurality of capacity reduction levels based on the statistical probabilities. The method may further include sending, by the thermostat management server, the capacity reduction level to the utility provider computer system.

In some embodiments, a non-transitory, computer-readable medium may include instructions that, when executed by one or more processors, cause the one or more processors to perform operations including receiving, from a plurality of thermostats, information that characterizes energy usage associated with the plurality of thermostats, and receiving, from a utility provider computer system, parameters characterizing proposed future demand-response events. The operations may also include selecting a combination of thermostats from the plurality of thermostats for which the energy usage can be reduced, and simulating a demand response event based on the parameters and using different weather conditions for the combination of the plurality of thermostats. The operations may additionally include generating statistical probabilities of meeting a plurality of capacity reduction levels based on the different weather conditions, and selecting a capacity reduction level from the plurality of capacity reduction levels based on the statistical probabilities. The operations may further include sending the capacity reduction level to the utility provider computer system.

In any embodiments, one or more of the following features may be implemented in any combination and without limitation. The parameters characterizing the proposed future demand-response events may include a capacity reduction requirement. The parameters characterizing the proposed future demand-response events may include payout ratio vs. delivered-capacity ratio. Simulating the demand response event may include using a plurality of Monte-Carlo simulations. The method/operations may also include loading a dispatch engine to select the combination of thermostats from the plurality of thermostats for which the energy usage can be reduced, selecting the combination of thermostats from the plurality of thermostats for which the energy usage can be reduced, determining whether an actual energy usage of the combination of thermostats meets the capacity reduction level, and adding or subtracting thermostats from the combination of thermostats during successive time intervals to meet the capacity reduction level. The information that characterizes the energy usage associated with the plurality of thermostats may include HVAC capacities and thermal characteristics of associated buildings. Simulating the demand response event may include compensating for simulation noise. The statistical probabilities of meeting a plurality of capacity reduction levels may include a plurality of probability curves, wherein the plurality of probability curves comprises an expected value curve, a $10^{th}$ percentile curve, and the $90^{th}$ percentile curve.

BRIEF DESCRIPTION OF THE DRAWINGS

FIG. 6C-6D illustrate exploded front and rear perspective views, respectively, of a head unit with respect to its primary components, according to some embodiments.

FIG. 6G-6H illustrate exploded front and rear perspective views, respectively, of a back plate unit with respect to its primary components, according to some embodiments.

DETAILED DESCRIPTION OF THE INVENTION

The Smart-Home Environment

A detailed description of the inventive body of work is provided herein. While several embodiments are described, it should be understood that the inventive body of work is not limited to any one embodiment, but instead encompasses numerous alternatives, modifications, and equivalents. In addition, while numerous specific details are set forth in the following description in order to provide a thorough understanding of the inventive body of work, some embodiments can be practiced without some or all of these details. Moreover, for the purpose of clarity, certain technical material that is known in the related art has not been described in detail in order to avoid unnecessarily obscuring the inventive body of work.

As used herein the term "HVAC" includes systems providing both heating and cooling, heating only, cooling only, as well as systems that provide other occupant comfort and/or conditioning functionality such as humidification, dehumidification and ventilation.

As used herein the terms power "harvesting," "sharing" and "stealing" when referring to HVAC thermostats all refer to thermostats that are designed to derive power from the power transformer through the equipment load without using a direct or common wire source directly from the transformer.

As used herein the term "residential" when referring to an HVAC system means a type of HVAC system that is suitable to heat, cool and/or otherwise condition the interior of a building that is primarily used as a single family dwelling. An example of a cooling system that would be considered residential would have a cooling capacity of less than about 5 tons of refrigeration (1 ton of refrigeration=12,000 Btu/h).

As used herein the term "light commercial" when referring to an HVAC system means a type of HVAC system that is suitable to heat, cool and/or otherwise condition the interior of a building that is primarily used for commercial purposes, but is of a size and construction that a residential HVAC system is considered suitable. An example of a cooling system that would be considered residential would have a cooling capacity of less than about 5 tons of refrigeration.

As used herein the term "thermostat" means a device or system for regulating parameters such as temperature and/or humidity within at least a part of an enclosure. The term "thermostat" may include a control unit for a heating and/or cooling system or a component part of a heater or air conditioner. As used herein the term "thermostat" can also refer generally to a versatile sensing and control unit (VSCU unit) that is configured and adapted to provide sophisticated, customized, energy-saving HVAC control functionality while at the same time being visually appealing, non-intimidating, elegant to behold, and delightfully easy to use.

Figure 1:
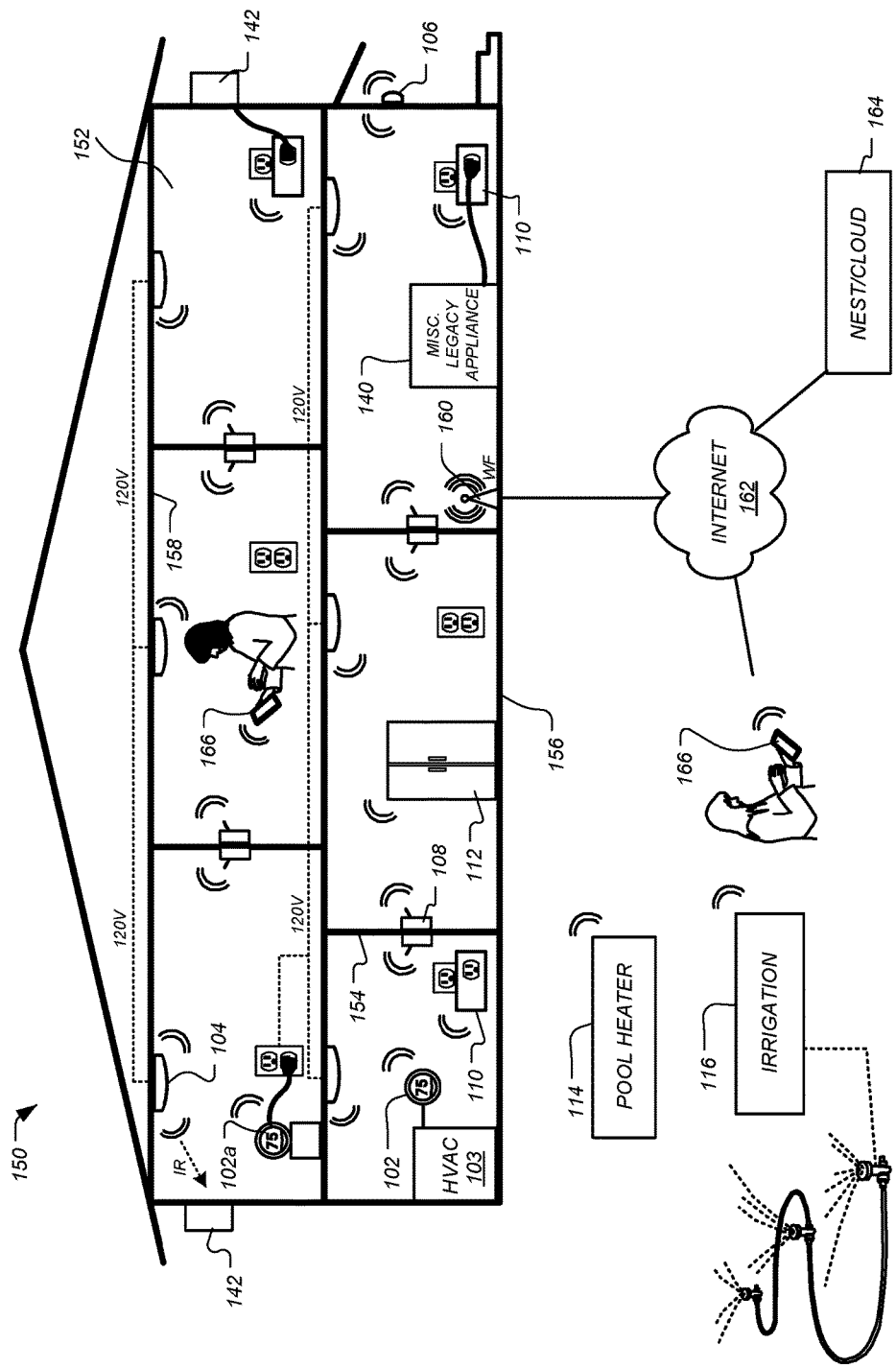
FIG. 1 illustrates an example of a smart home environment within which one or more of the devices, methods, systems, services, and/or computer program products described further herein can be applicable.

FIG. 1 illustrates an example of a smart home environment within which one or more of the devices, methods, systems, services, and/or computer program products described further herein can be applicable. The depicted smart home environment includes a structure 150, which can include, e.g., a house, office building, garage, or mobile home. It will be appreciated that devices can also be integrated into a smart home environment that does not include an entire structure 150, such as an apartment, condominium, or office space. Further, the smart home environment can control and/or be coupled to devices outside of the actual structure 150. Indeed, several devices in the smart home environment need not physically be within the structure 150 at all. For example, a device controlling a pool heater or irrigation system can be located outside of the structure 150.

The depicted structure 150 includes a plurality of rooms 152, separated at least partly from each other via walls 154. The walls 154 can include interior walls or exterior walls. Each room can further include a floor 156 and a ceiling 158. Devices can be mounted on, integrated with and/or supported by a wall 154, floor or ceiling.

The smart home depicted in FIG. 1 includes a plurality of devices, including intelligent, multi-sensing, network-connected devices that can integrate seamlessly with each other and/or with cloud-based server systems to provide any of a variety of useful smart home objectives. One, more or each of the devices illustrated in the smart home environment and/or in the figure can include one or more sensors, a user interface, a power supply, a communications component, a modularity unit and intelligent software as described herein. Examples of devices are shown in FIG. 1.

An intelligent, multi-sensing, network-connected thermostat 102 can detect ambient climate characteristics (e.g., temperature and/or humidity) and control a heating, ventilation and air-conditioning (HVAC) system 103. One or more intelligent, network-connected, multi-sensing hazard detection units 104 can detect the presence of a hazardous substance and/or a hazardous condition in the home environment (e.g., smoke, fire, or carbon monoxide). One or more intelligent, multi-sensing, network-connected entryway interface devices 106, which can be termed a "smart doorbell", can detect a person's approach to or departure from a location, control audible functionality, announce a person's approach or departure via audio or visual means, or control settings on a security system (e.g., to activate or deactivate the security system).

Each of a plurality of intelligent, multi-sensing, network-connected wall light switches 108 can detect ambient lighting conditions, detect room-occupancy states and control a power and/or dim state of one or more lights. In some instances, light switches 108 can further or alternatively control a power state or speed of a fan, such as a ceiling fan. Each of a plurality of intelligent, multi-sensing, network-connected wall plug interfaces 110 can detect occupancy of a room or enclosure and control supply of power to one or more wall plugs (e.g., such that power is not supplied to the plug if nobody is at home). The smart home may further include a plurality of intelligent, multi-sensing, network-connected appliances 112, such as refrigerators, stoves and/or ovens, televisions, washers, dryers, lights (inside and/or outside the structure 150), stereos, intercom systems, garage-door openers, floor fans, ceiling fans, whole-house fans, wall air conditioners, pool heaters 114, irrigation systems 116, security systems (including security system components such as cameras, motion detectors and window/door sensors), and so forth. While descriptions of FIG. 1 can identify specific sensors and functionalities associated with specific devices, it will be appreciated that any of a variety of sensors and functionalities (such as those described throughout the specification) can be integrated into the device.

In addition to containing processing and sensing capabilities, each of the devices 102, 104, 106, 108, 110, 112, 114 and 116 can be capable of data communications and information sharing with any other of the devices 102, 104, 106, 108, 110, 112, 114 and 116, as well as to any cloud server or any other device that is network-connected anywhere in the world. The devices can send and receive communications via any of a variety of custom or standard wireless protocols (Wi-Fi, ZigBee, 6LoWPAN, Thread, Bluetooth, BLE, HomeKit Accessory Protocol (HAP), Weave, etc.) and/or any of a variety of custom or standard wired protocols (CAT6 Ethernet, HomePlug, etc.). The wall plug interfaces 110 can serve as wireless or wired repeaters, and/or can function as bridges between (i) devices plugged into AC outlets and communicating using Homeplug or other power line protocol, and (ii) devices that not plugged into AC outlets.

For example, a first device can communicate with a second device via a wireless router 160. A device can further communicate with remote devices via a connection to a network, such as the Internet 162. Through the Internet 162, the device can communicate with a central server or a cloud-computing system 164. The central server or cloud-computing system 164 can be associated with a manufacturer, support entity or service provider associated with the device. For one embodiment, a user may be able to contact customer support using a device itself rather than needing to use other communication means such as a telephone or Internet-connected computer. Further, software updates can be automatically sent from the central server or cloud-computing system 164 to devices (e.g., when available, when purchased, or at routine intervals).

By virtue of network connectivity, one or more of the smart-home devices of FIG. 1 can further allow a user to interact with the device even if the user is not proximate to the device. For example, a user can communicate with a device using a computer (e.g., a desktop computer, laptop computer, or tablet) or other portable electronic device (e.g., a smartphone). A webpage or app can be configured to receive communications from the user and control the device based on the communications and/or to present information about the device's operation to the user. For example, the user can view a current setpoint temperature for a device and adjust it using a computer. The user can be in the structure during this remote communication or outside the structure.

The smart home also can include a variety of non-communicating legacy appliances 140, such as old conventional washer/dryers, refrigerators, and the like which can be controlled, albeit coarsely (ON/OFF), by virtue of the wall plug interfaces 110. The smart home can further include a variety of partially communicating legacy appliances 142, such as IR-controlled wall air conditioners or other IR-controlled devices, which can be controlled by IR signals provided by the hazard detection units 104 or the light switches 108.

Figure 2:
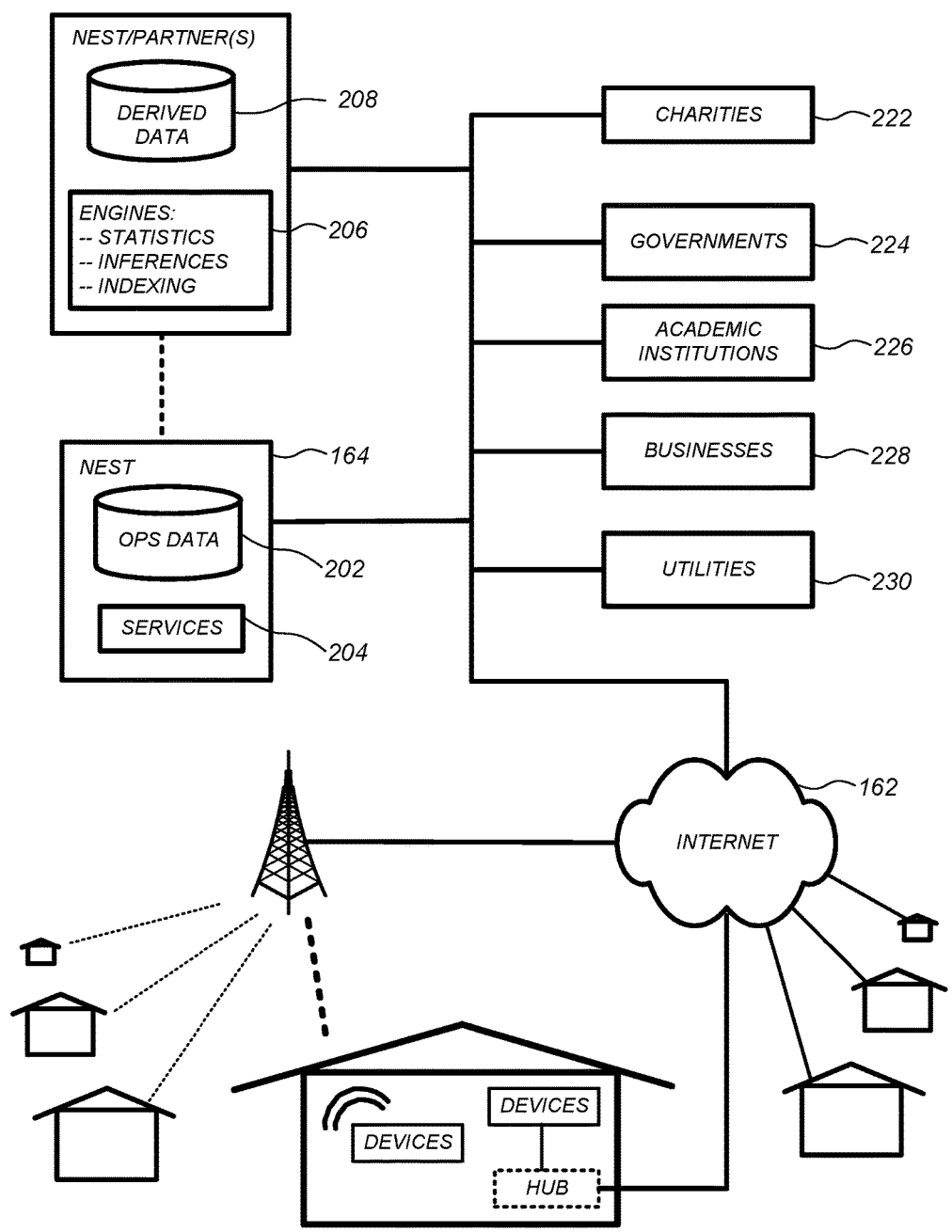
FIG. 2 illustrates a network-level view of an extensible devices and services platform with which the smart home of FIG. 1 can be integrated, according to some embodiments.

FIG. 2 illustrates a network-level view of an extensible devices and services platform with which the smart home of FIG. 1 can be integrated, according to some embodiments. Each of the intelligent, network-connected devices from FIG. 1 can communicate with one or more remote central servers or cloud computing systems 164. The communication can be enabled by establishing connection to the Internet 162 either directly (for example, using 3G/4G connectivity to a wireless carrier), though a hubbed network (which can be scheme ranging from a simple wireless router, for example, up to and including an intelligent, dedicated whole-home control node), or through any combination thereof.

The central server or cloud-computing system 164 can collect operation data 202 from the smart home devices. For example, the devices can routinely transmit operation data or can transmit operation data in specific instances (e.g., when requesting customer support). The central server or cloud-computing architecture 164 can further provide one or more services 204. The services 204 can include, e.g., software update, customer support, sensor data collection/logging, remote access, remote or distributed control, or use suggestions (e.g., based on collected operation data 204 to improve performance, reduce utility cost, etc.). Data associated with the services 204 can be stored at the central server or cloud-computing system 164 and the central server or cloud-computing system 164 can retrieve and transmit the data at an appropriate time (e.g., at regular intervals, upon receiving request from a user, etc.).

One salient feature of the described extensible devices and services platform, as illustrated in FIG. 2, is a processing engines 206, which can be concentrated at a single server or distributed among several different computing entities without limitation. Processing engines 206 can include engines configured to receive data from a set of devices (e.g., via the Internet or a hubbed network), to index the data, to analyze the data and/or to generate statistics based on the analysis or as part of the analysis. The analyzed data can be stored as derived data 208. Results of the analysis or statistics can thereafter be transmitted back to a device providing ops data used to derive the results, to other devices, to a server providing a webpage to a user of the device, or to other non-device entities. For example, use statistics, use statistics relative to use of other devices, use patterns, and/or statistics summarizing sensor readings can be transmitted. The results or statistics can be provided via the Internet 162. In this manner, processing engines 206 can be configured and programmed to derive a variety of useful information from the operational data obtained from the smart home. A single server can include one or more engines.

The derived data can be highly beneficial at a variety of different granularities for a variety of useful purposes, ranging from explicit programmed control of the devices on a per-home, per-neighborhood, or per-region basis (for example, demand-response programs for electrical utilities), to the generation of inferential abstractions that can assist on a per-home basis (for example, an inference can be drawn that the homeowner has left for vacation and so security detection equipment can be put on heightened sensitivity), to the generation of statistics and associated inferential abstractions that can be used for government or charitable purposes. For example, processing engines 206 can generate statistics about device usage across a population of devices and send the statistics to device users, service providers or other entities (e.g., that have requested or may have provided monetary compensation for the statistics). As specific illustrations, statistics can be transmitted to charities 222, governmental entities 224 (e.g., the Food and Drug Administration or the Environmental Protection Agency), academic institutions 226 (e.g., university researchers), businesses 228 (e.g., providing device warranties or service to related equipment), or utility companies 230. These entities can use the data to form programs to reduce energy usage, to preemptively service faulty equipment, to prepare for high service demands, to track past service performance, etc., or to perform any of a variety of beneficial functions or tasks now known or hereinafter developed.

Figure 3:
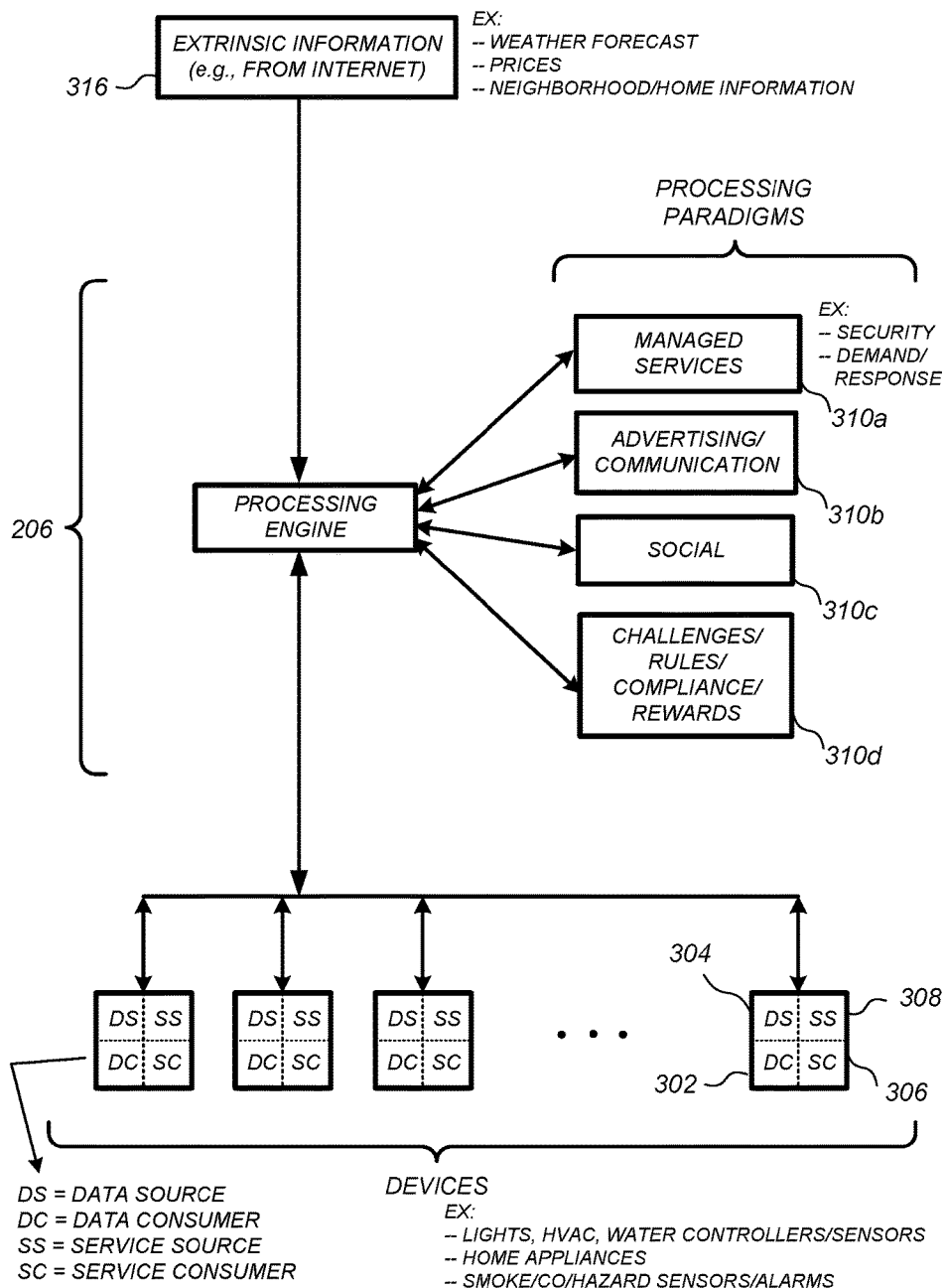
FIG. 3 illustrates an abstracted functional view of the extensible devices and services platform of FIG. 2, according to some embodiments.

FIG. 3 illustrates an abstracted functional view of the extensible devices and services platform of FIG. 2, with particular reference to the processing engine 206 as well as the devices of the smart home. Even though the devices situated in the smart home will have an endless variety of different individual capabilities and limitations, they can all be thought of as sharing common characteristics in that each of them is a data consumer 302 (DC), a data source 304 (DS), a services consumer 306 (SC), and a services source 308 (SS). Advantageously, in addition to providing the essential control information needed for the devices to achieve their local and immediate objectives, the extensible devices and services platform can also be configured to harness the large amount of data that is flowing out of these devices. In addition to enhancing or optimizing the actual operation of the devices themselves with respect to their immediate functions, the extensible devices and services platform can also be directed to "repurposing" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

For example, FIG. 3 shows processing engine 206 as including a number of paradigms 310. Processing engine 206 can include a managed services paradigm 310a that monitors and manages primary or secondary device functions. The device functions can include ensuring proper operation of a device given user inputs, estimating that (e.g., and responding to) an intruder is or is attempting to be in a dwelling, detecting a failure of equipment coupled to the device (e.g., a light bulb having burned out), implementing or otherwise responding to energy demand response events, or alerting a user of a current or predicted future event or characteristic. Processing engine 206 can further include an advertising/communication paradigm 310b that estimates characteristics (e.g., demographic information), desires and/ or products of interest of a user based on device usage. Services, promotions, products or upgrades can then be offered or automatically provided to the user. Processing engine 206 can further include a social paradigm 310c that uses information from a social network, provides information to a social network (for example, based on device usage), processes data associated with user and/or device interactions with the social network platform. For example, a user's status as reported to their trusted contacts on the social network could be updated to indicate when they are home based on light detection, security system inactivation or device usage detectors. As another example, a user may be able to share device-usage statistics with other users. Processing engine 206 can include a challenges/rules/compliance/rewards paradigm 310d that informs a user of challenges, rules, compliance regulations and/or rewards and/or that uses operation data to determine whether a challenge has been met, a rule or regulation has been complied with and/or a reward has been earned. The challenges, rules or regulations can relate to efforts to conserve energy, to live safely (e.g., reducing exposure to toxins or carcinogens), to conserve money and/or equipment life, to improve health, etc.

Processing engine can integrate or otherwise utilize extrinsic information 316 from extrinsic sources to improve the functioning of one or more processing paradigms. Extrinsic information 316 can be used to interpret operational data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, etc., to identify statistical or environmental conditions, trends or other information associated with a home or neighborhood, and so forth.

An extraordinary range and variety of benefits can be brought about by, and fit within the scope of, the described extensible devices and services platform, ranging from the ordinary to the profound. Thus, in one "ordinary" example, each bedroom of the smart home can be provided with a smoke/fire/CO alarm that includes an occupancy sensor, wherein the occupancy sensor is also capable of inferring (e.g., by virtue of motion detection, facial recognition, audible sound patterns, etc.) whether the occupant is asleep or awake. If a serious fire event is sensed, the remote security/monitoring service or fire department is advised of how many occupants there are in each bedroom, and whether those occupants are still asleep (or immobile) or whether they have properly evacuated the bedroom. While this is, of course, a very advantageous capability accommodated by the described extensible devices and services platform, there can be substantially more "profound" examples that can truly illustrate the potential of a larger "intelligence" that can be made available. By way of perhaps a more "profound" example, the same data bedroom occupancy data that is being used for fire safety can also be "repurposed" by the processing engine 206 in the context of a social paradigm of neighborhood child development and education. Thus, for example, the same bedroom occupancy and motion data discussed in the "ordinary" example can be collected and made available for processing (properly anonymized) in which the sleep patterns of schoolchildren in a particular ZIP code can be identified and tracked. Localized variations in the sleeping patterns of the schoolchildren may be identified and correlated, for example, to different nutrition programs in local schools.

Figure 4:
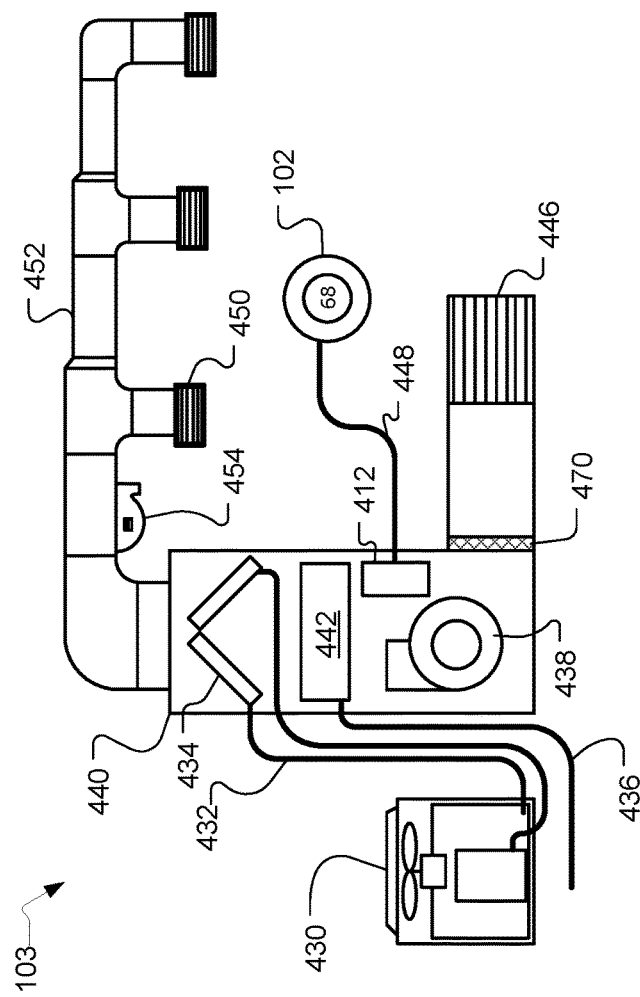
FIG. 4 illustrates a schematic diagram of an HVAC system, according to some embodiments.

FIG. 4 is a schematic diagram of an HVAC system, according to some embodiments. HVAC system 103 provides heating, cooling, ventilation, and/or air handling for an enclosure, such as structure 150 depicted in FIG. 1. System 103 depicts a forced air type heating and cooling system, although according to other embodiments, other types of HVAC systems could be used such as radiant heat based systems, heat-pump based systems, and others.

For carrying out the heating function, heating coils or elements 442 within air handler 440 provide a source of heat using electricity or gas via line 436. Cool air is drawn from the enclosure via return air duct 446 through filter 470, using a fan 438 and is heated through heating coils or elements 442. The heated air flows back into the enclosure at one or more locations via supply air duct system 452 and supply air registers such as register 450. In cooling, an outside compressor 430 passes a refrigerant gas through a set of heat exchanger coils and then through an expansion valve. The gas then goes through line 432 to the cooling coils or evaporator coils 434 in the air handler 440 where it expands, cools and cools the air being circulated via fan 438. A humidifier 454 may optionally be included in various embodiments that returns moisture to the air before it passes through duct system 452. Although not shown in FIG. 4, alternate embodiments of HVAC system 103 may have other functionality such as venting air to and from the outside, one or more dampers to control airflow within the duct system 452 and an emergency heating unit. Overall operation of HVAC system 103 is selectively actuated by control electronics 412 communicating with thermostat 102 over control wires 448.

The Smart-Home Thermostat

Figure 5A:
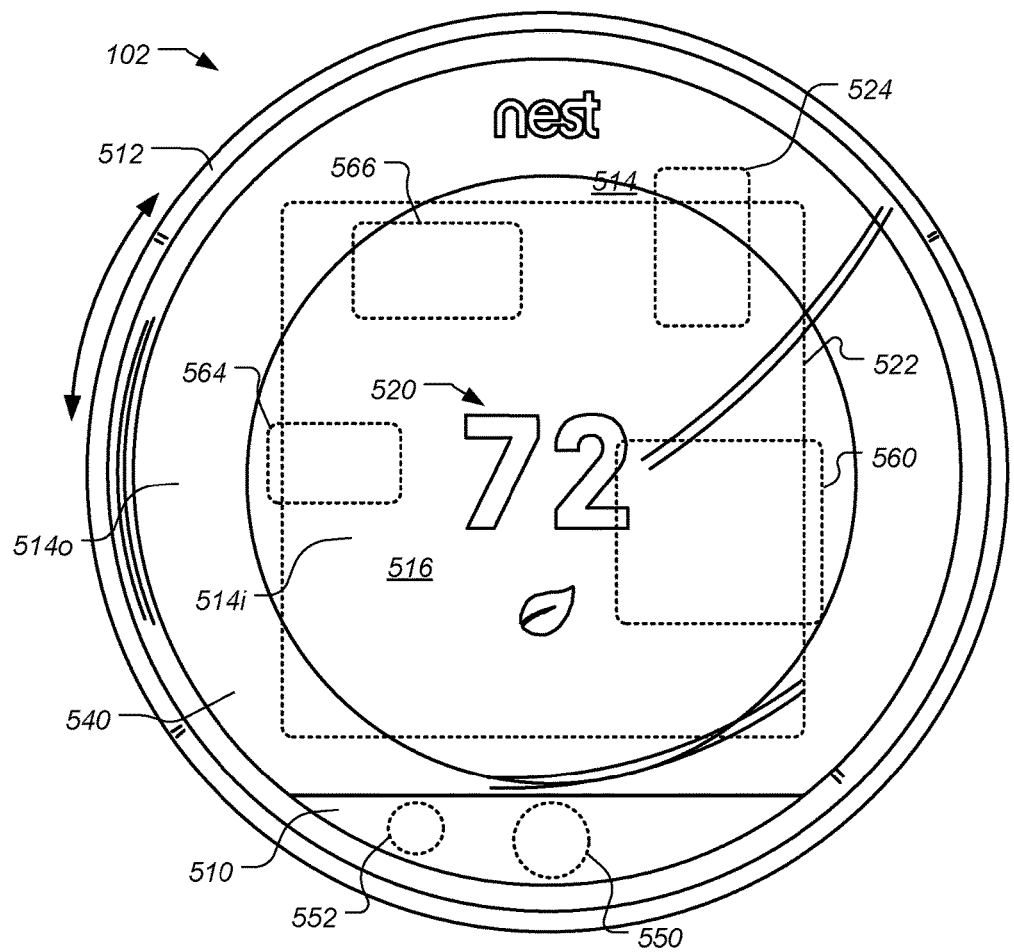
FIG. 5A-5D illustrate a thermostat having a visually pleasing, smooth, sleek and rounded exterior appearance while at the same time including one or more sensors for detecting occupancy and/or users, according to some embodiments.
Figure 5B:
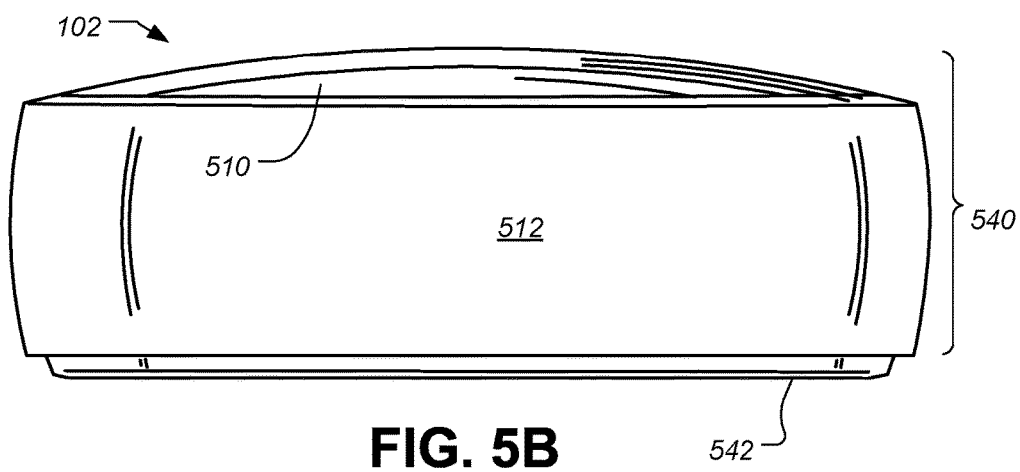
Figure 5C:
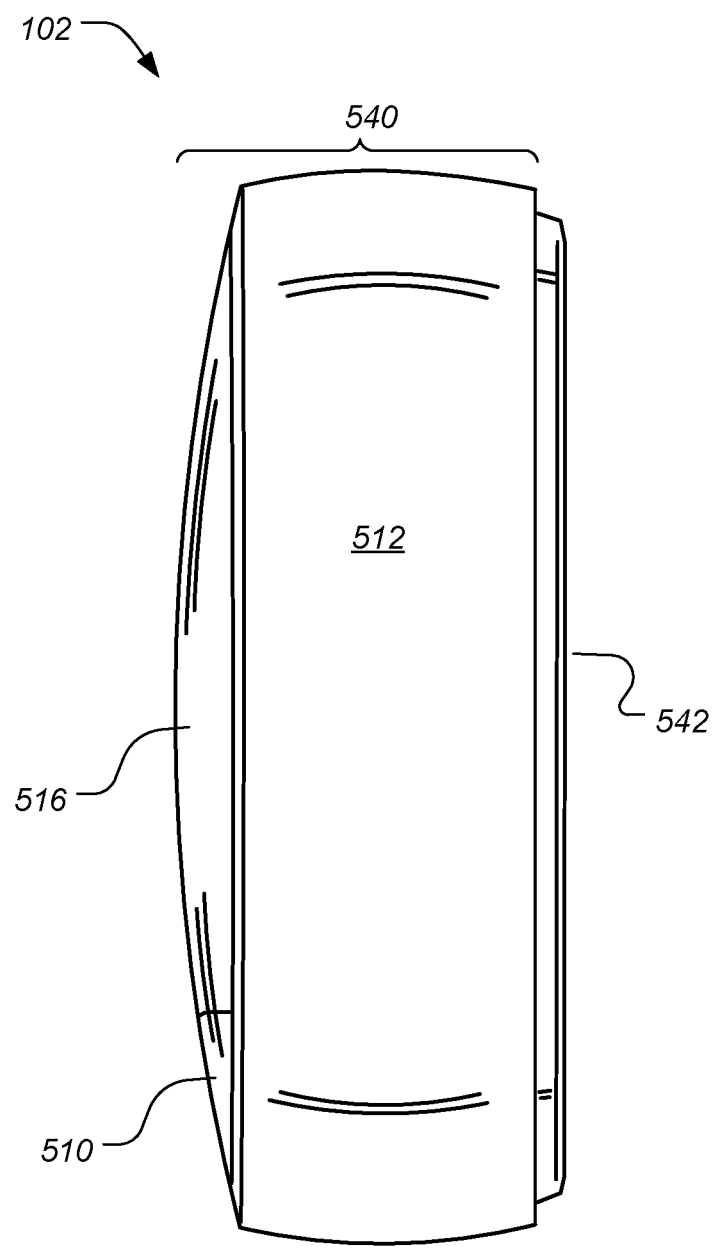
Figure 5D:
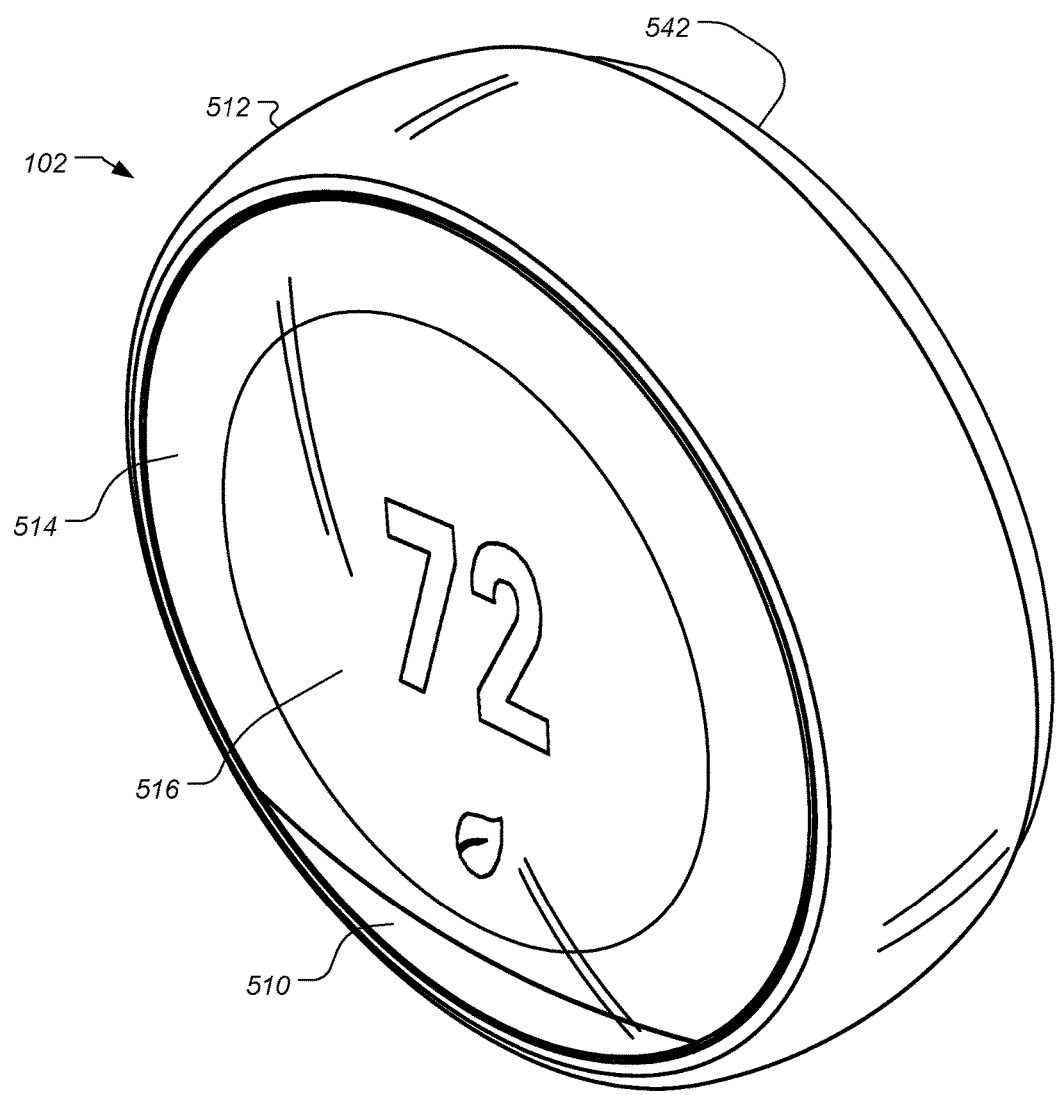

FIGS. 5A-5D illustrate a thermostat having a rounded exterior appearance and including one or more sensors for detecting environmental conditions, such as occupancy and/or users, temperature, ambient light, humidity, and so forth. FIG. 5A is front view, FIG. 5B is a bottom elevation, FIG. 5C is a right side elevation, and FIG. 5D is perspective view of thermostat 102. Unlike many prior art thermostats, thermostat 102 has a simple and elegant design. Moreover, user interaction with thermostat 102 is facilitated and greatly enhanced over known conventional thermostats. The thermostat 102 includes control circuitry and is electrically connected to an HVAC system 103, such as is shown in FIGS. 1-4. Thermostat 102 is wall mountable, is circular in shape, and has an outer rotatable ring 512 for receiving user input. Thermostat 102 has a large convex rounded front face lying inside the outer rotatable ring 512. According to some embodiments, thermostat 102 is approximately 84 mm in diameter and protrudes from the wall, when wall mounted, by 30 mm. The outer rotatable ring 512 allows the user to make adjustments, such as selecting a new setpoint temperature. For example, by rotating the outer ring 512 clockwise, the real-time (i.e. currently active) setpoint temperature can be increased, and by rotating the outer ring 512 counter-clockwise, the real-time setpoint temperature can be decreased.

The front face of the thermostat 102 comprises a cover 514 that according to some embodiments is polycarbonate, and a lens 510 having an outer shape that matches the contours of the curved outer front face of the thermostat 102. According to some embodiments, Fresnel lens elements may are formed on the interior surface of the lens 510 such that they are not obviously visible by viewing the exterior of the thermostat 102. Behind the lens 510 is a passive infrared (PIR) sensor 550 for detecting occupancy, a temperature sensor that is thermally coupled to the lens 510, and a multi-channel thermopile for detecting occupancy, user approaches, and motion signatures. The Fresnel lens elements of the lens 510 are made from a high-density polyethylene (HDPE) that has an infrared transmission range appropriate for sensitivity to human bodies. The lens 510 may also include thin sections that allow a near-field proximity sensor 552, such as a multi-channel thermopile, and a temperature sensor to "see-through" the lens 510 with minimal interference from the polyethylene. As shown in FIGS. 5A-5D, the front edge of the outer rotatable ring 512, cover 514, and lens 510 are shaped such that they together form an integrated convex rounded front face that has a common outward arc or spherical shape arcing outward.

Although being formed from a single lens-like piece of material such as polycarbonate, the cover 514 has two different regions or portions including an outer portion 514o and a central portion 514i. According to some embodiments, the cover 514 is darkened around the outer portion 514o, but leaves the central portion 514i visibly clear so as to facilitate viewing of an electronic display 516 disposed underneath. According to some embodiments, the cover 514 acts as a lens that tends to magnify the information being displayed in electronic display 516 to users. According to some embodiments the central electronic display 516 is a dot-matrix layout (i.e. individually addressable) such that arbitrary shapes can be generated. According to some embodiments, electronic display 516 is a backlit, color liquid crystal display (LCD). An example of information displayed on the electronic display 516 is illustrated in FIG. 5A, and includes central numerals 520 that are representative of a current setpoint temperature. The thermostat 102 may be constructed such that the electronic display 516 is at a fixed orientation and does not rotate with the outer rotatable ring 512. For some embodiments, the cover 514 and lens 510 also remain at a fixed orientation and do not rotate with the outer ring 512. In alternative embodiments, the cover 514 and/or the lens 510 can rotate with the outer rotatable ring 512. According to one embodiment in which the diameter of the thermostat 102 is about 84 mm, the diameter of the electronic display 516 is about 54 mm. According to some embodiments the curved shape of the front surface of thermostat 102, which is made up of the cover 514, the lens 510 and the front facing portion of the ring 512, is spherical, and matches a sphere having a radius of between 100 mm and 180 mm. According to some embodiments, the radius of the spherical shape of the thermostat front is about 156 mm.

Motion sensing with PIR sensor 550 as well as other techniques can be used in the detection and/or prediction of occupancy. According to some embodiments, occupancy information is used in generating an effective and efficient scheduled program. A second near-field proximity sensor 552 is also provided to detect an approaching user. The near-field proximity sensor 552 can be used to detect proximity in the range of up to 10-15 feet. the PIR sensor 550 and/or the near-field proximity sensor 552 can detect user presence such that the thermostat 102 can initiate "waking up" and/or providing adaptive screen displays that are based on user motion/position when the user is approaching the thermostat and prior to the user touching the thermostat. Such use of proximity sensing is useful for enhancing the user experience by being "ready" for interaction as soon as, or very soon after the user is ready to interact with the thermostat. Further, the wake-up-on-proximity functionality also allows for energy savings within the thermostat by "sleeping" when no user interaction is taking place our about to take place.

According to some embodiments, the thermostat 102 may be controlled by at least two types of user input, the first being a rotation of the outer rotatable ring 512 as shown in FIG. 5A, and the second being an inward push on head unit 540 until an audible and/or tactile "click" occurs. For such embodiments, the head unit 540 is an assembly that includes the outer ring 512, the cover 514, the electronic display 516, and the lens 510. When pressed inwardly by the user, the head unit 540 travels inwardly by a small amount, such as 0.5 mm, against an interior switch (not shown), and then springably travels back out when the inward pressure is released, providing a tactile "click" along with a corresponding audible clicking sound. Thus, for the embodiment of FIGS. 5A-5D, an inward click can be achieved by direct pressing on the outer rotatable ring 512 itself, or by indirect pressing of the outer rotatable ring 512 by virtue of providing inward pressure on the cover 514, the lens 510, or by various combinations thereof. For other embodiments, the thermostat 102 can be mechanically configured such that only the outer ring 512 travels inwardly for the inward click input, while the cover 514 and lens 510 remain motionless.

FIG. 5B and FIG. 5C are bottom and right side elevation views of the thermostat 102. According to some embodiments, the thermostat 102 includes a processing system 560, display driver 564 and a wireless communications system 566. The processing system 560 is adapted to cause the display driver 564 and display 516 to display information to the user, and to receiver user input via the outer rotatable ring 512. The processing system 560, according to some embodiments, is capable of carrying out the governance of the operation of thermostat 102 including various user interface features. The processing system 560 is further programmed and configured to carry out other operations, such as maintaining and updating a thermodynamic model for the enclosure in which the HVAC system is installed. According to some embodiments, a wireless communications system 566 is used to communicate with devices such as personal computers, other thermostats or HVAC system components, smart phones, local home wireless networks, routers, gateways, home appliances, security systems, hazard detectors, remote thermostat management servers, distributed sensors and/or sensor systems, and other components it the modern smart-home environment. Such communications may include peer-to-peer communications, communications through one or more servers located on a private network, or and/or communications through a cloud-based service.

According to some embodiments, the thermostat 102 includes a head unit 540 and a backplate (or wall dock) 542. Head unit 540 of thermostat 102 is slidably mountable onto back plate 542 and slidably detachable therefrom. According to some embodiments the connection of the head unit 540 to backplate 542 can be accomplished using magnets, bayonet, latches and catches, tabs, and/or ribs with matching indentations, or simply friction on mating portions of the head unit 540 and backplate 542. Also shown in FIG. 5A is a rechargeable battery 522 that is recharged using recharging circuitry 524 that uses power from backplate that is either obtained via power harvesting (also referred to as power stealing and/or power sharing) from the HVAC system control circuit(s) or from a common wire, if available. According to some embodiments, the rechargeable battery 522 may include a single cell lithium-ion battery, or a lithium-polymer battery.

Figure 6A:
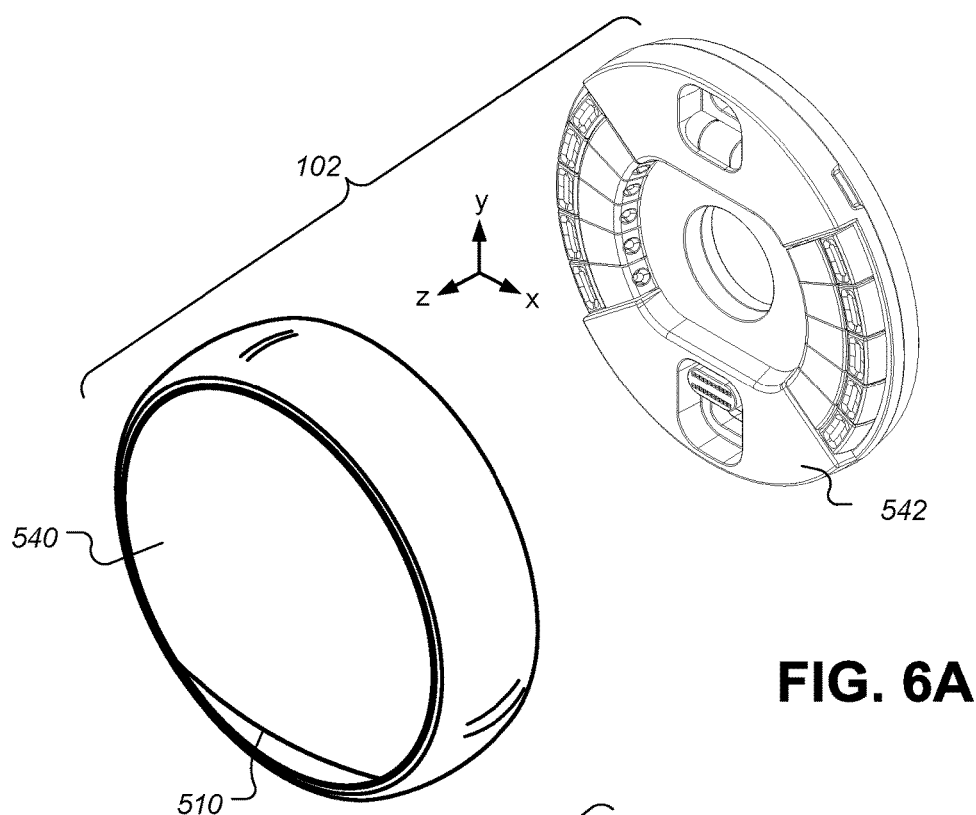
FIG. 6A-6B illustrate exploded front and rear perspective views, respectively, of a thermostat with respect to its two main components, according to some embodiments.
Figure 6B:
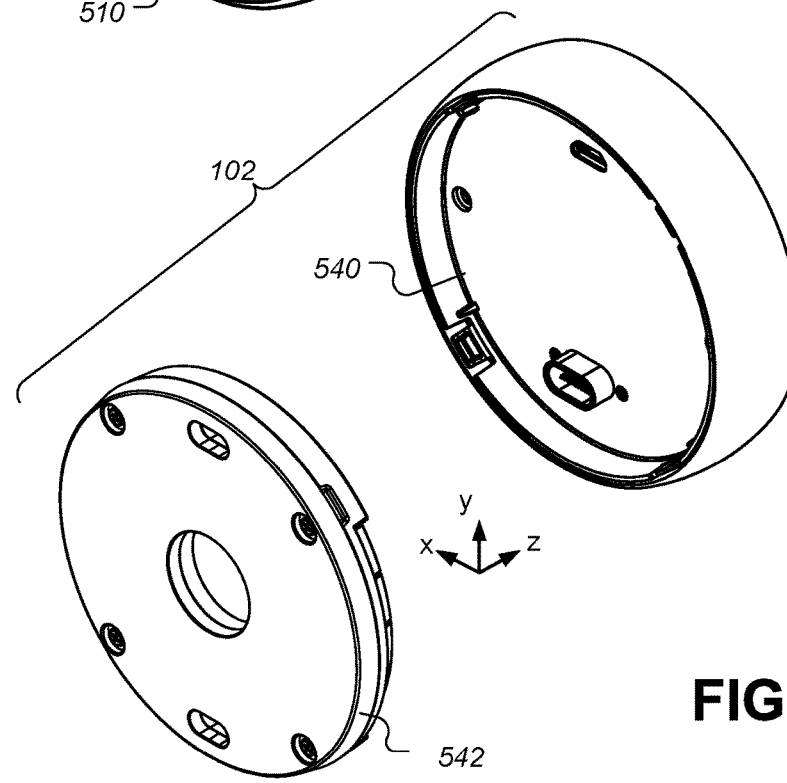

FIGS. 6A-6B illustrate exploded front and rear perspective views, respectively, of the thermostat 102 with respect to its two main components, which are the head unit 540 and the backplate 542. In the drawings shown herein, the "z" direction is outward from the wall, the "y" direction is the toe-to-head direction relative to a walk-up user, and the "x" direction is the user's left-to-right direction.

Figure 6D:
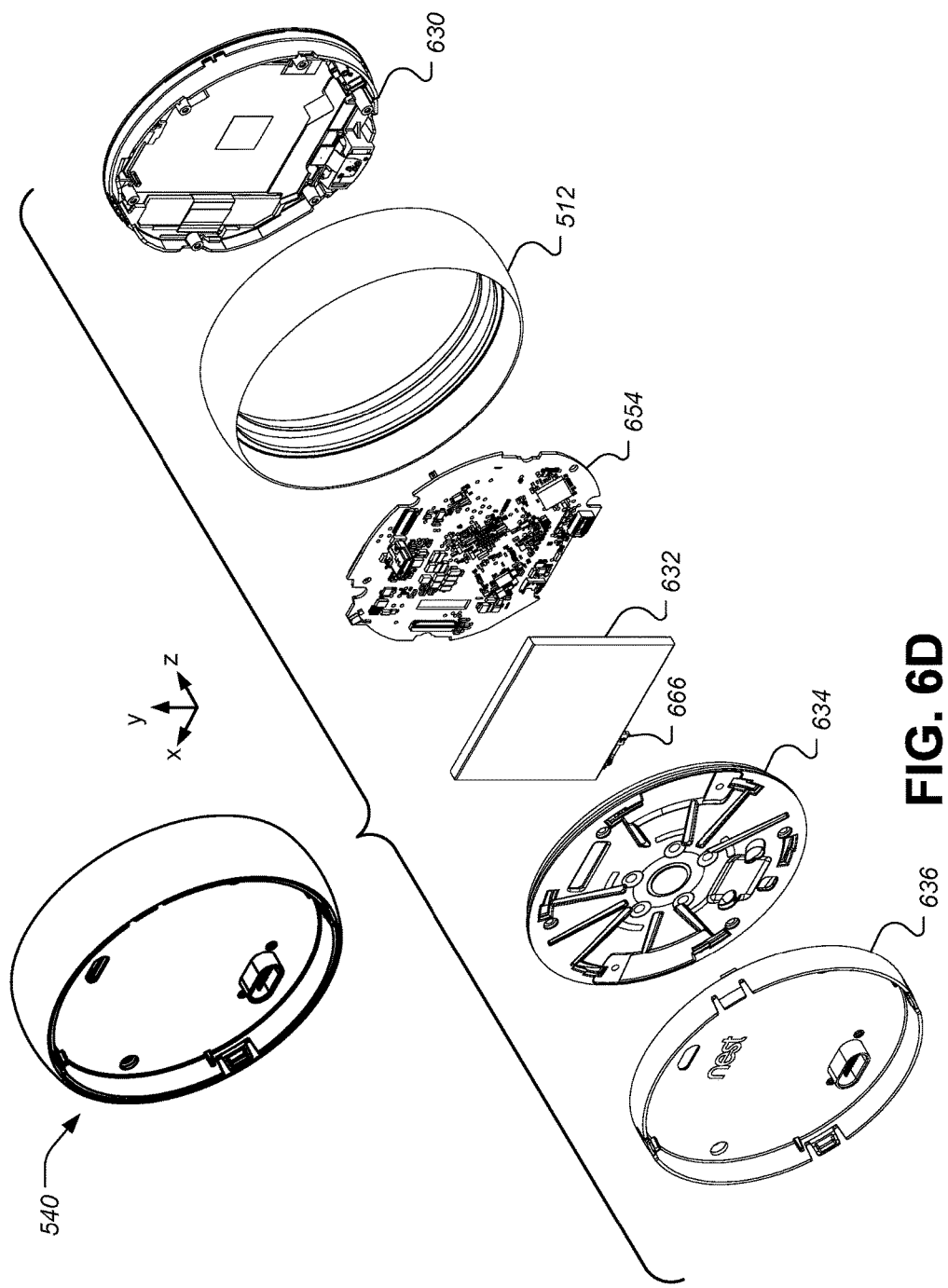

FIGS. 6C-6D illustrate exploded front and rear perspective views, respectively, of the head unit 540 with respect to its primary components. Head unit 540 includes, a back cover 636, a bottom frame 634, a battery assembly 632 with the rechargeable battery 522, a head unit printed circuit board (PCB) 654, the outer rotatable ring 512, the cover 514, and the lens 510. Behind the lens is the display assembly 630, which will be described in relation to FIGS. 6E-6F below. Electrical components on the head unit PCB 654 can connect to electrical components on the back plate 542 by virtue of a plug-type electrical connector on the back cover 636. The head unit PCB 654 is secured to head unit back cover 636 and display assembly 630. The outer rotatable ring 512 is held between a bearing surface on the display assembly 630 and bearing surfaces on the bottom frame 634. Motion of the outer rotatable ring 512 in the z direction is constrained by flat bearing surfaces on the display assembly 630 and bottom frame 634, while motion of the ring in x and y directions are constrained at least in part by circular rounded surfaces on the bottom frame 634. According to some embodiments, the bearing surfaces of the bottom frame 634 and/or the display assembly 630 are greased and/or otherwise lubricated to both smooth and dampen rotational movement for the outer ring 512. The head unit printed PCB 654 may include some or all of processing system 560, display driver 564, wireless communication system 566, and battery recharging circuitry 524 as shown and described with respect to FIG. 5A, as well as one or more additional memory storage components. According to some embodiments, circuitry and components are mounted on both sides of head unit PCB 654. Although not shown, according to some embodiments, shielding can surround circuitry and components on both sides of the head unit PCB 654.

Battery assembly 632 includes a rechargeable battery 522. Battery assembly 632 also includes connecting wires 666, and a battery mounting film that is attached to battery 522 using a strong adhesive and/or the any rear shielding of head unit PCB 654 using a relatively weaker adhesive. According to some embodiments, the battery assembly 632 is user-replaceable.

Figure 6E:
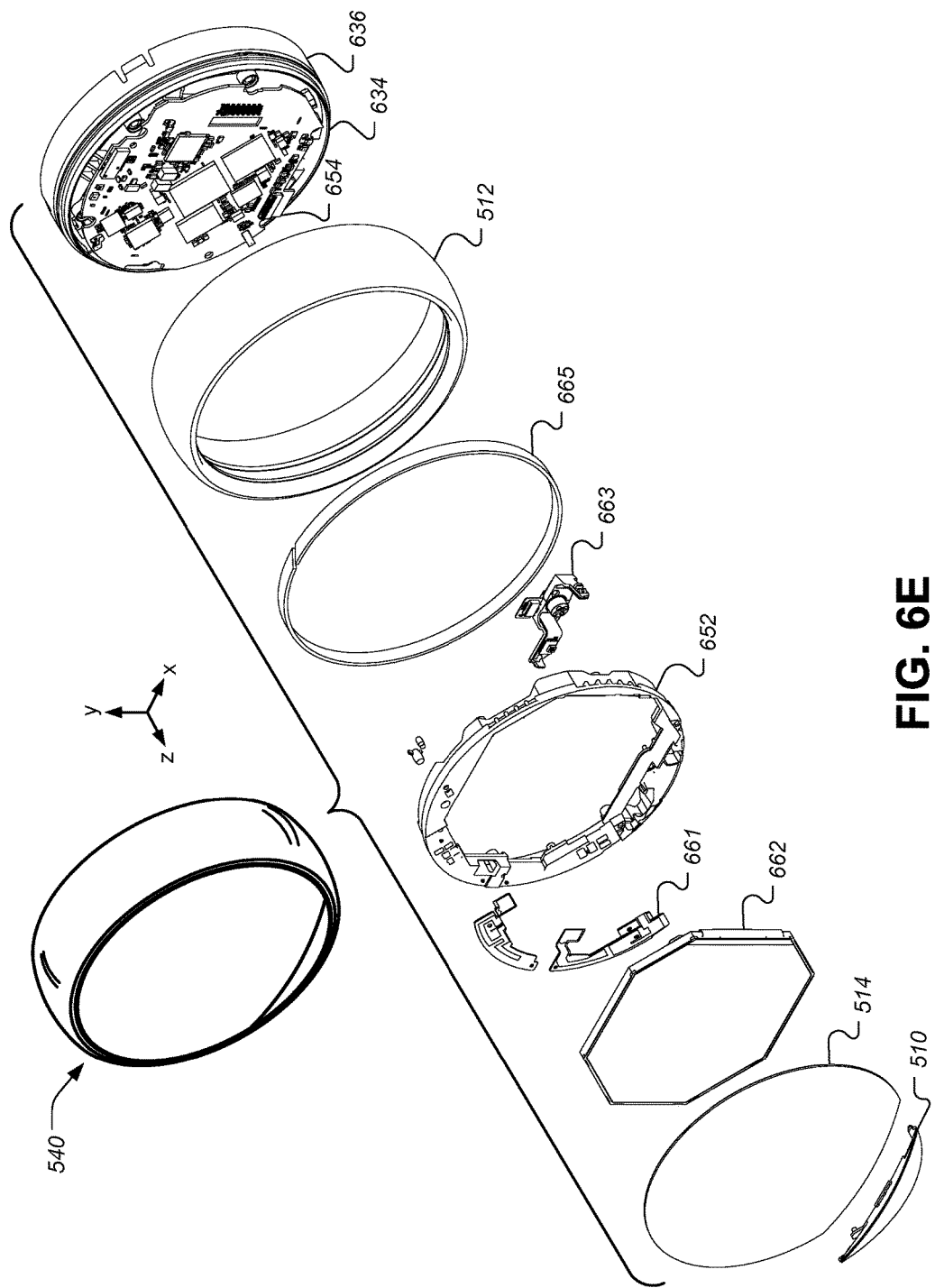
FIG. 6E-6F illustrate exploded front and rear perspective views, respectively, of a head unit display assembly with respect to its primary components, according to some embodiments.
Figure 6F:
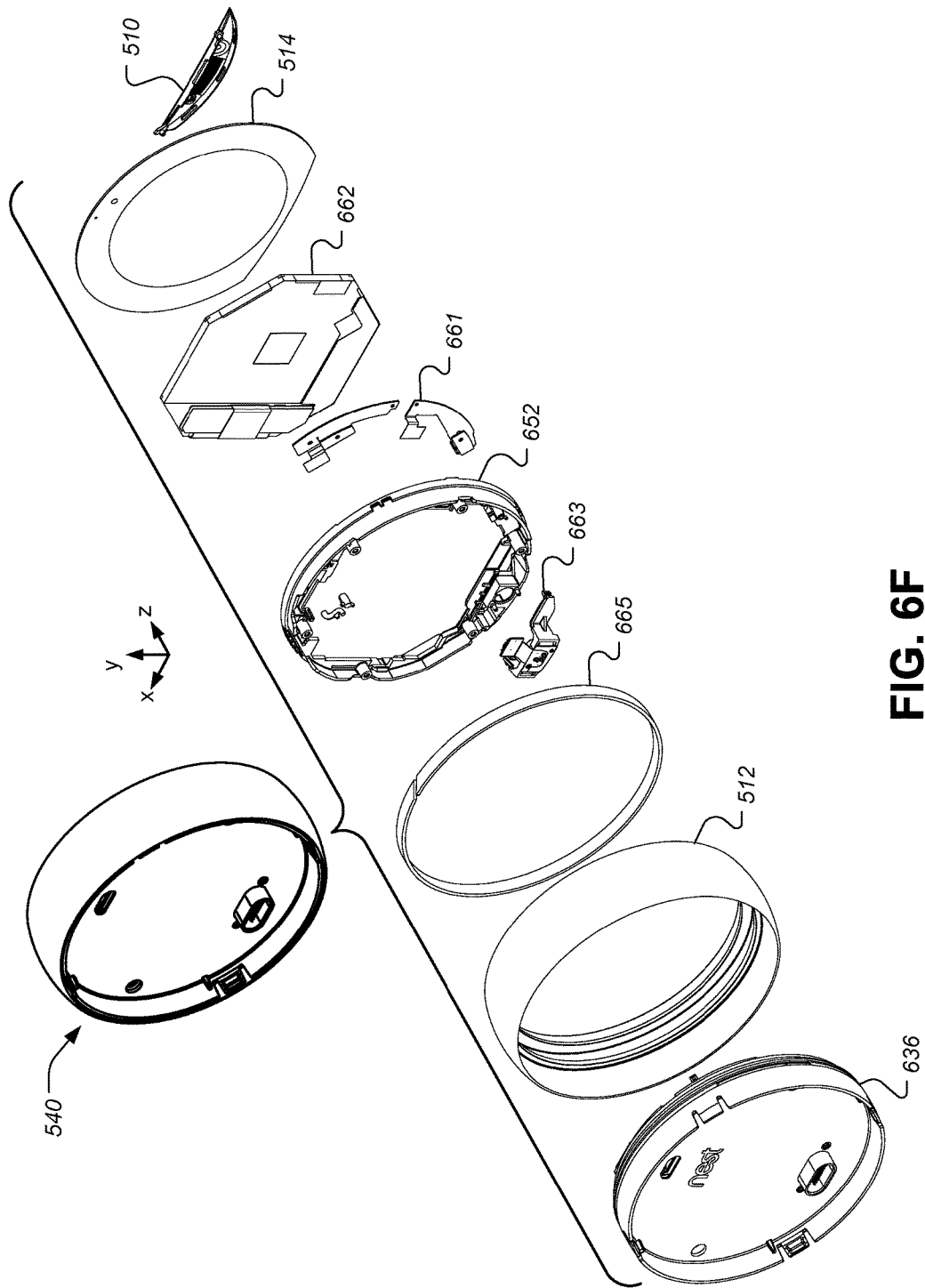

FIGS. 6E-6F illustrate exploded front and rear perspective views, respectively, of the head unit 540 with an exploded view of the display assembly 630. The display assembly 630 comprises the cover 514, the lens 510, an LCD module 662, a pair of RF antennas 661, a head unit top frame 652, a sensor flex assembly 663, and a magnetic ring 665. The sensor flex assembly 663 connects to the head unit PCB 654 using a connector on a flexible PCB. The sensor flex assembly 663 also includes the PIR sensor 550 and the near-field proximity sensor 552. Additionally, the sensor flex assembly 663 may include a temperature sensor IC that is positioned close to the lens 515 so as to accurately measure temperature outside of the thermostat 102 without being overly affected by internal heating of thermostat components. The sensor flex assembly 663 may be comprised of these three sensors, along with a flexible PCB (including the connector for the head unit PCB 654) and a plastic bracket to which the sensors and flexible PCB are mounted. The bracket ensures that the sensor flex assembly 663 is positioned and oriented consistently and correctly with respect to the lens 510. The lens 510 includes two sections that are thinned to approximately 0.3 mm in front of the near-field proximity sensor 552 and the temperature sensor. The lens 510 also includes a section with a Fresnel lens pattern in front of the PIR sensor 550. In some embodiments, additional temperature sensors may be placed throughout the thermostat 102, such as a temperature sensor on the head unit PCB 654 and a temperature sensor on the back plate PCB 680.

The head unit PCB 554 includes a Hall effect sensor that senses rotation of the magnetic ring 665. The magnetic ring 665 is mounted to the inside of the outer rotatable ring 512 using an adhesive such that the outer rotatable ring 512 and the magnetic ring 665 are rotated together. The magnetic ring 665 includes striated sections of alternating magnetic polarity that are diagonally positioned around the magnetic ring 665. The Hall effect sensor senses the alternations between magnetic polarities as the outer ring 512 is rotated. The Hall effect sensor can be controlled by a primary processor, which is a higher powered processor, without excessive power drain implications because the primary processor will invariably be awake already when the user is manually turning the outer rotatable ring 512 to control the user interface. Advantageously, very fast response times can also be provided by the primary processor.

The antennas 661 are mounted to the top surface of the head unit top frame 652. The wireless communications system 566 may include Wi-Fi radios of various frequencies (e.g., 2.4 GHz and 5.0 GHz), along with an IEEE 802.15.4-compliant radio unit for a local-area smart home device network that may include other thermostats, hazard detectors, security system modules, and so forth. The IEEE 802.15.4 unit may use the Thread protocol for achieving such communications. In some embodiments, the wireless communications system 566 may also include a Bluetooth low energy (BLE) radio for communication with user devices.

The processing system 560 may be primarily located on the head unit PCB 654 and may include a primary processor and a secondary processor. The primary processor may be a comparatively high-powered processor, such as the AM3703 chip, or the MCIMX6X3EVK10AB chip from Freescale™, and may be programmed to perform sophisticated thermostat operations, such as time-to-temperature calculations, occupancy determination algorithms, ambient temperature compensation calculations, software updates, wireless transmissions, operation of the display driver 564, and regulation of the recharging circuitry 524. The secondary processor, such as the STM32L chip from ST microelectronics, may be a comparatively low-power processor when compared to the primary processor. The secondary processor may interact with the HVAC system to control a series of FET switches that control the functioning of the HVAC system. The secondary processor may also interface with various sensors in thermostat 102, such as the temperature sensors, a humidity sensor, an ambient light sensor, and/or the like. The secondary processor may also share duties with the primary processor in regulating the recharging circuitry 522 to provide power to all of the electrical systems on board the thermostat 102. Generally, the primary processor will operate in a "sleep" mode until high-power processing operations (e.g., wireless communications, user interface interactions, time-to-temperature calculations, thermal model calculations, etc.) are required, while the secondary processor will operate in an "awake" mode more often than the primary processor in order to monitor environmental sensors and wake the primary processor when needed.

FIGS. 6G-6H illustrate exploded front and rear perspective views, respectively, of the back plate unit 542 with respect to its primary components, according to some embodiments. Back plate unit 542 comprises a back plate rear plate 682, a back plate PCB 680, and a back plate cover 670. Visible in FIG. 6G are the HVAC wire connectors 684 that include integrated mechanical wire insertion sensing circuitry, and relatively large capacitors 686 that are used by part of the power stealing circuitry that is mounted on the back plate PCB 680. According to some embodiments, backplate 542 includes electronics and a temperature/humidity sensor in housing. Wire connectors 684 are provided to allow for connection to HVAC system wires, which pass through the large central circular opening 690, which is visible in each of the backplate primary components. Also visible in each of the backplate primary components are two mounting holes 692 and 694 for use in fixing the backplate to the wall. Also visible in FIGS. 6G-6H are a bubble level 672 to allow the user to install the thermostat 102 in a level position without additional tools.

The back plate PCB 680 also may include approximately seven custom power isolation ICs 685 that isolate the internal electronics of the thermostat 102 from the relatively high 24 VAC signals of the HVAC system. The power isolation ICs 685 are custom software-resettable fuses that both monitor transient and anomalous voltage/current signals on the HVAC power/return wires and switch off the connection to isolate the thermostat against any dangerous signals that could damage the internal electronics. The power isolation ICs 685 receive command signals encoded in a clock square wave from the processing system 560 to open and close a pair of power FETs for each HVAC return wire in order to activate the corresponding HVAC function (e.g., fan, air-conditioning, heat, heat pump, etc.). A complete description of the power isolation ICs 685 is given in the commonly assigned U.S. patent application Ser. No. 14/591,804 filed on Jan. 7, 2015, which is hereby incorporated herein by reference in its entirety for all purposes.

Figure 7:
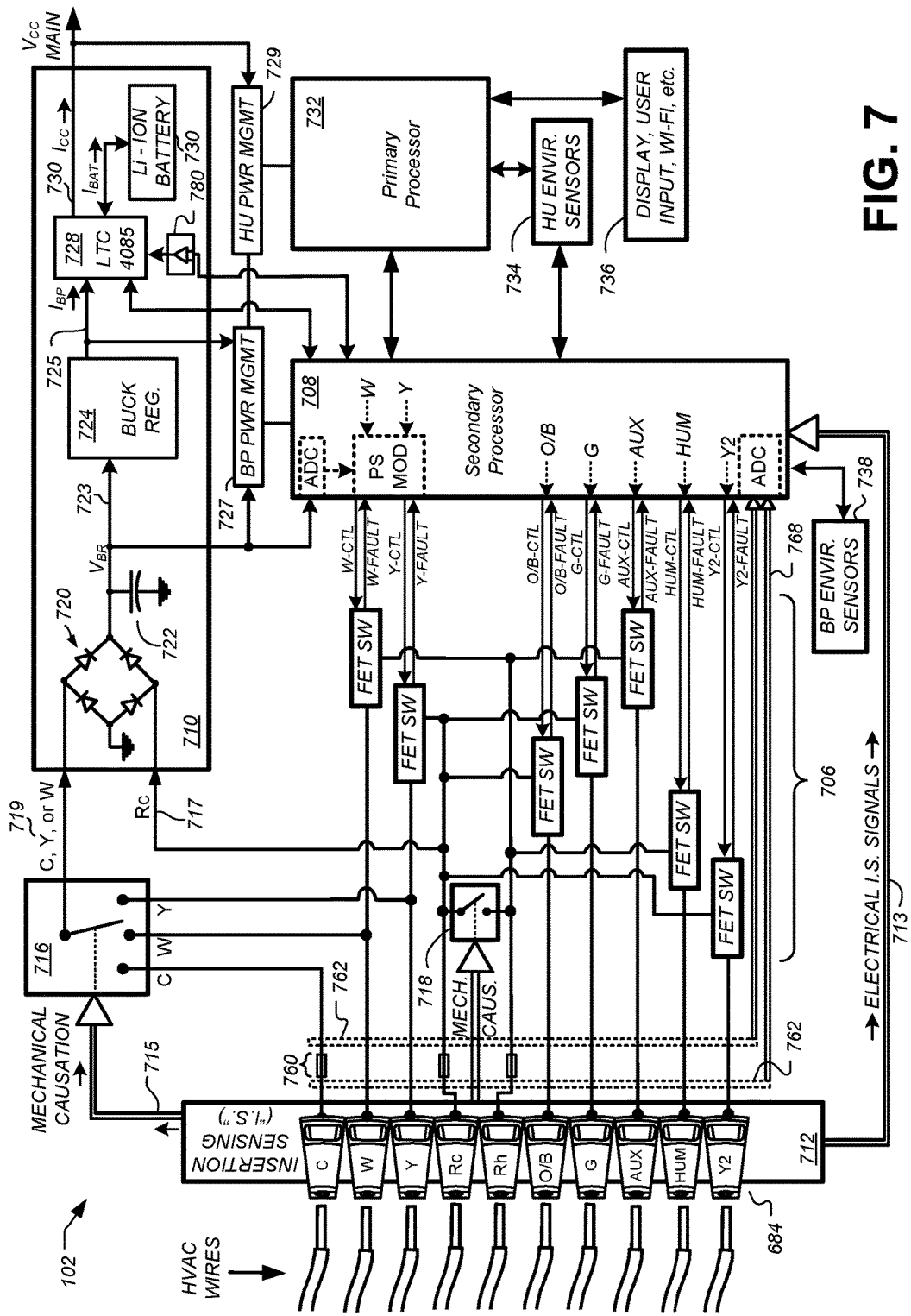
FIG. 7 illustrates a block diagram illustrating circuitry within a thermostat, according to some embodiments.

FIG. 7 illustrates a power management and power harvesting system for a smart thermostat, according to some embodiments. FIG. 7 shows connections to common HVAC wiring, such as a W (heat call relay wire); Y (cooling call relay wire); Y2 (second stage cooling call relay wire); Rh (heat call relay power); Rc (cooling call relay power); G (fan call relay wire); O/B (heat pump call relay wire); AUX (auxiliary call relay wire); HUM (humidifier call relay wire); and C (common wire). As discussed above, the thermostat 102 comprises a plurality of FET switches 706 (such as the power isolation ICs 685 of FIG. 6H above) used for carrying out the essential thermostat operations of connecting or "shorting" one or more selected pairs of HVAC wires together according to the desired HVAC operation. The operation of each of the FET switches 706 is controlled by the secondary processor 708 which can comprise, for example, an STM32L 32-bit ultra-low power ARM-based microprocessor available from ST Microelectronics.

Thermostat 102 further comprises powering circuitry 710 that comprises components contained on both the backplate 542 and head unit 540. Generally speaking, it is the purpose of powering circuitry 710 to extract electrical operating power from the HVAC wires and convert that power into a usable form for the many electrically-driven components of the thermostat 102. Thermostat 102 further comprises insertion sensing components 712 configured to provide automated mechanical and electrical sensing regarding the HVAC wires that are inserted into the thermostat 102. Thermostat 102 further comprises a relatively high-power primary processor 732, such as an AM3703 Sitara ARM microprocessor available from Texas Instruments, that provides the main general governance of the operation of the thermostat 102. Thermostat 102 further comprises environmental sensors 734/738 (e.g., temperature sensors, humidity sensors, active IR motion sensors, passive IR motion sensors, multi-channel thermopiles, ambient visible light sensors, accelerometers, ambient sound sensors, ultrasonic/infrasonic sound sensors, microwave sensors, GPS sensors, etc.), as well as other components 736 (e.g., electronic display devices and circuitry, user interface devices and circuitry, wired communications circuitry, wireless communications circuitry, etc.) that are operatively coupled to the primary processor 732 and/or secondary processor 708 and collectively configured to provide the functionalities described in the instant disclosure.

The insertion sensing components 712 include a plurality of HVAC wiring connectors 684, each containing an internal springable mechanical assembly that, responsive to the mechanical insertion of a physical wire thereinto, will mechanically cause an opening or closing of one or more dedicated electrical switches associated therewith. With respect to the HVAC wiring connectors 684 that are dedicated to the C, W, Y, Rc, and Rh terminals, those dedicated electrical switches are, in turn, networked together in a manner that yields the results that are illustrated in FIG. 7 by the blocks 716 and 718. The output of block 716, which is provided at a node 719, is dictated solely by virtue of the particular combination of C, W, and Y connectors into which wires have been mechanically inserted in accordance with the following rules: if a wire is inserted into the C connector, then the node 719 becomes the C node regardless of whether there are any wires inserted into the Y or W connectors; if no wire is inserted into the C connector and a wire is inserted into the Y connector, then the node 719 becomes the Y node regardless of whether there is a wire inserted into the W connector; and if no wire is inserted into either of the C or Y connectors, then the node 719 becomes the W node. Block 718 is shown as being coupled to the internal sensing components 712 by virtue of double lines termed "mechanical causation," for the purpose of denoting that its operation, which is either to short the Rc and Rh nodes together or not to short the Rc and Rh nodes together. Whether the block 718 will short, or not short, the Rc and Rh nodes together is dictated solely by virtue of the particular combination of Rc and Rh connectors into which wires have been mechanically inserted. Block 718 will keep the Rc and Rh nodes shorted together, unless wires have been inserted into both the Rc and Rh connectors, in which case the block 718 will not short the Rc and Rh nodes together because a two-HVAC-transformer system is present. The insertion sensing circuitry 712 is also configured to provide at least two signals to the secondary processor 708, the first being a simple "open" or "short" signal that corresponds to the mechanical insertion of a wire, and the second being a voltage or other level signal that represents a sensed electrical signal at that terminal. The first and second electrical signals for each of the respective wiring terminals can advantageously be used as a basis for basic "sanity checking" to help detect and avoid erroneous wiring conditions.

Basic operation of each of the FET switches 706 is achieved by virtue of a respective control signal (e.g., W-CTL, Y-CTL) provided by the secondary processor 708 that causes the corresponding FET switch 706 to "connect" or "short" its respective HVAC lead inputs for an ON control signal, and that causes the corresponding FET switch 706 to "disconnect" or "leave open" or "open up" its respective HVAC lead inputs for an "OFF" control signal. By virtue of the above-described operation of block 718, it is automatically the case that for single-transformer systems having only an "R" wire (rather than separate Rc and Rh wires as would be present for two-transformer systems), that "R" wire can be inserted into either of the Rc or Rh terminals, and the Rh-Rc nodes will be automatically shorted to form a single "R" node, as needed for proper operation. In contrast, for dual-transformer systems, the insertion of two separate wires into the respective Rc and Rh terminals will cause the Rh-Rc nodes to remain disconnected to maintain two separate Rc and Rh nodes, as needed for proper operation.

Referring now to the powering circuitry 710 in FIG. 7, provided is a configuration that automatically adapts to the powering situation presented to the thermostat 102 at the time of installation and thereafter. The powering circuitry 710 comprises a full-wave bridge rectifier 720, a storage and waveform-smoothing bridge output capacitor 722 (which can be, for example, on the order of 30 microfarads), a buck regulator circuit system 724, a power-and-battery (PAB) regulation circuit 728, and a rechargeable lithium-ion battery 730. In conjunction with other control circuitry including backplate power management circuitry 727, head unit power management circuitry 729, and the secondary processor 708, the powering circuitry 710 is configured and adapted to have the characteristics and functionality described hereinbelow.

By virtue of the configuration illustrated in FIG. 7, when there is a "C" wire presented upon installation, the powering circuitry 710 operates as a relatively high-powered, rechargeable-battery-assisted AC-to-DC converting power supply. When there is not a "C" wire presented, the powering circuitry 710 operates as a power-stealing, rechargeable-battery-assisted AC-to-DC converting power supply. As illustrated in FIG. 7, the powering circuitry 710 generally serves to provide the voltage Vcc MAIN that is used by the various electrical components of the thermostat 102, and that in one embodiment will usually be about 3.7V~3.95V. The general purpose of powering circuitry 710 is to convert the 24 VAC presented between the input leads 719 and 717 to a steady DC voltage output at the Vcc MAIN node to supply the thermostat electrical power load.

Operation of the powering circuitry 710 for the case in which the "C" wire is present is now described. When the 24 VAC input voltage between nodes 719 and 717 is rectified by the full-wave bridge rectifier 720, a DC voltage at node 723 is present across the bridge output capacitor 722, and this DC voltage is converted by the buck regulator system 724 to a relatively steady voltage, such as 4.4 volts, at node 725, which provides an input current $I_{BP}$ to the power-and-battery (PAB) regulation circuit 728.

The secondary processor 708 controls the operation of the powering circuitry 710 at least by virtue of control leads leading between the secondary processor 708 and the PAB regulation circuit 728, which for one embodiment can include an LTC4085-4 chip available from Linear Technologies Corporation. The LTC4085-4 is a USB power manager and Li-Ion/Polymer battery charger originally designed for portable battery-powered applications. The PAB regulation circuit 728 provides the ability for the secondary processor 708 to specify a maximum value $I_{BP}$(max) for the input current $I_{BP}$. The PAB regulation circuit 728 is configured to keep the input current at or below $I_{BP}$(max), while also providing a steady output voltage Vcc, such as 4.0 volts, while also providing an output current Icc that is sufficient to satisfy the thermostat electrical power load, while also tending to the charging of the rechargeable battery 730 as needed when excess power is available, and while also tending to the proper discharging of the rechargeable battery 730 as needed when additional power (beyond what can be provided at the maximum input current $I_{BP}$(max)) is needed to satisfy the thermostat electrical power load.

Operation of the powering circuitry 710 for the case in which the "C" wire is not present is now described. As used herein, "inactive power stealing" refers to the power stealing that is performed during periods in which there is no active call in place based on the lead from which power is being stolen. As used herein, "active power stealing" refers to the power stealing that is performed during periods in which there is an active call in place based on the lead from which power is being stolen.

During inactive power stealing, power is stolen from between, for example, the "Y" wire that appears at node 719 and the Rc lead that appears at node 717. There will be a 24 VAC HVAC transformer voltage present across nodes 719/717 when no cooling call is in place (i.e., when the Y-Rc FET switch is open). For one embodiment, the maximum current $I_{BP}$(max) is set to a relatively modest value, such as 20 mA, for the case of inactive power stealing. Assuming a voltage of about 4.4 volts at node 725, this corresponds to a maximum output power from the buck regulator system 724 of about 88 mW. This power level of 88 mW has been found to not accidentally trip the HVAC system into an "on" state due to the current following through the call relay coil. During this time period, the PAB regulator 728 operates to discharge the battery 730 during any periods of operation in which the instantaneous thermostat electrical power load rises above 88 mW, and to recharge the battery (if needed) when the instantaneous thermostat electrical power load drops below 88 mW. The thermostat 700 is configured such that the average power consumption is well below 88 mW, and indeed for some embodiments is even below 10 mW on a long-term time average.

Operation of the powering circuitry 710 for "active power stealing" is now described. During an active heating/cooling call, it is necessary for current to be flowing through the HVAC call relay coil sufficient to maintain the HVAC call relay in a "tripped" or ON state at all times during the active heating/cooling call. The secondary processor 708 is configured by virtue of circuitry denoted "PS MOD" to turn, for example, the Y-Rc FET switch OFF for small periods of time during the active cooling call, wherein the periods of time are small enough such that the cooling call relay does not "un-trip" into an OFF state, but wherein the periods of time are long enough to allow inrush of current into the bridge rectifier 720 to keep the bridge output capacitor 722 to a reasonably acceptable operating level. For one embodiment, this is achieved in a closed-loop fashion in which the secondary processor 708 monitors the voltage $V_{BR}$ at node 723 and actuates the signal Y-CTL as necessary to keep the bridge output capacitor 722 charged. According to one embodiment, it has been found advantageous to introduce a delay period, such as 60-90 seconds, following the instantiation of an active heating/cooling cycle before instantiating the active power stealing process. This delay period has been found useful in allowing many real-world HVAC systems to reach a kind of "quiescent" operating state in which they will be much less likely to accidentally un-trip away from the active cooling cycle due to active power stealing operation of the thermostat 102. According to another embodiment, it has been found further advantageous to introduce another delay period, such as 60-90 seconds, following the termination of an active cooling cycle before instantiating the inactive power stealing process. This delay period has likewise been found useful in allowing the various HVAC systems to reach a quiescent state in which accidental tripping back into an active cooling cycle is avoided.

Demand Response Events

Figure 8:
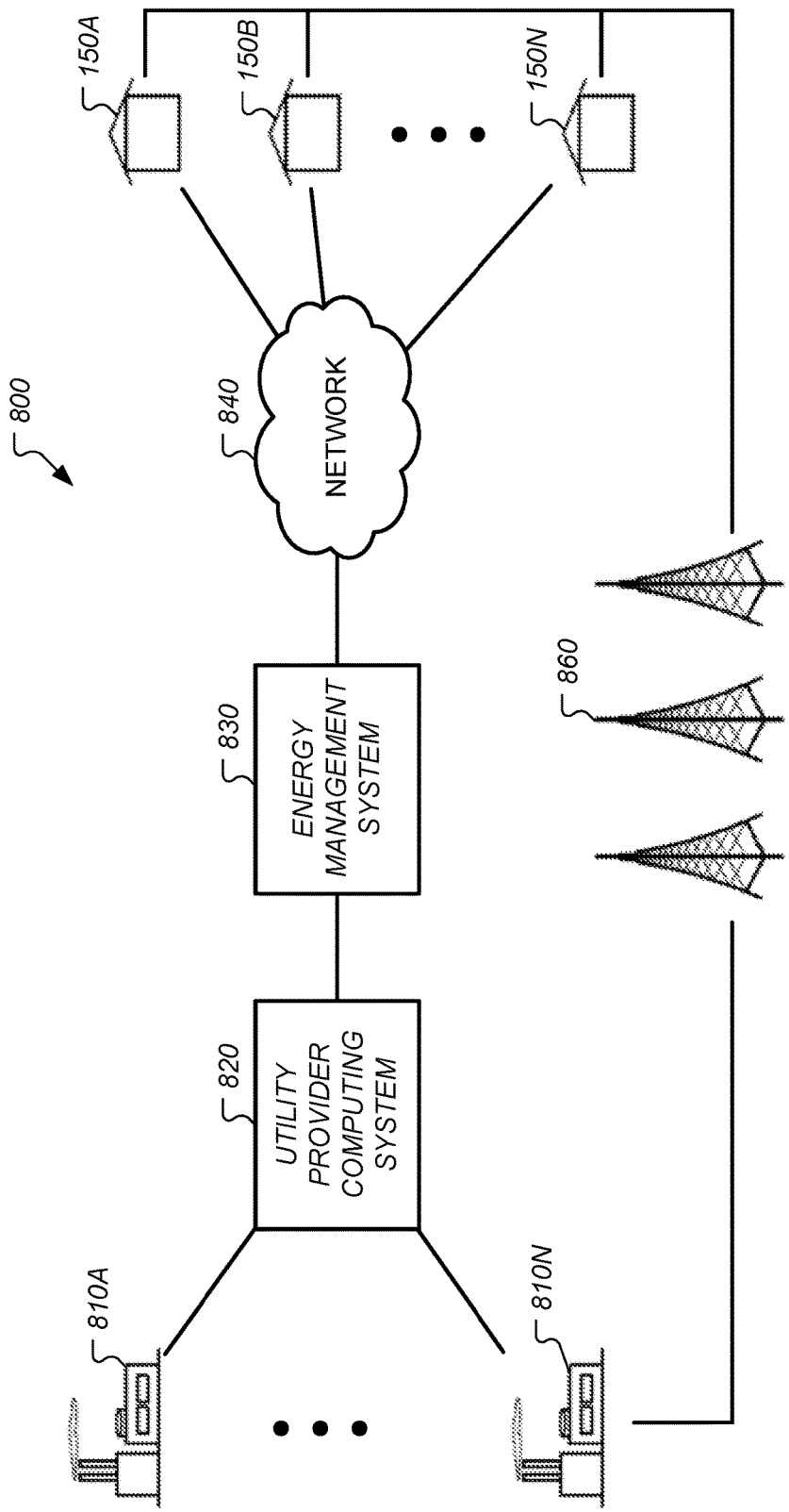
FIG. 8 illustrates an example of a smart home environment, within which one or more of the devices, methods, systems, services, and/or computer program products described further herein can be applicable.

FIG. 8 illustrates an example of a smart home environment, such as the smart home environment of FIG. 1, within which one or more of the devices, methods, systems, services, and/or computer program products described further herein can be applicable. The depicted smart home environment includes a structure 150, which can include, e.g., a house, office building, garage, or mobile home. In some embodiments, the structure 150 may correspond to one of structures 150A-150N described with reference to FIG. 1.

Embodiments discussed herein generally relate to techniques for managing demand-response programs and events. The entities in a system for managing demand-response programs and events typically include a utility provider that provides electrical or other forms of energy from a power source (e.g., an electrical generator) to individual's homes or businesses. The individuals typically pay for the amount of energy they consume on a periodic, e.g., monthly, basis. In many embodiments an energy management system is disposed between the utility provider and the individuals. The energy management system operates to intelligently and effectively shift energy consumption of the individuals from one particular time period to other time periods. Such energy shifting is usually performed so as to shift energy consumption from a high energy cost period to a low energy cost period. In the case of DR events, energy is shifted from the DR event period to time periods outside of the DR event period.

The energy management system according to many embodiments includes an intelligent, network-connected thermostat located at the individual's homes or businesses. Such a thermostat can acquire various information about the residence, such as a thermal retention characteristic of the residence, a capacity of an HVAC associated with the residence to cool or heat the residence, a likelihood of the residence being occupied (via occupancy sensors that, over time, can build an occupancy probability profile), a forecasted weather, a real-time weather, a real-time occupancy, etc. Moreover, the thermostat can be programmed by its users or may learn, over time, the preferences and habits of its users to set scheduled setpoints. In exemplary embodiments, a population of such network-connected thermostats associated with a respective population of individual homes and businesses are configured to communicate with one or more central servers managed by one or more cloud service providers. Each network-connected thermostat is associated with one or more accounts managed by the cloud service provider(s), and data is sent back and forth as needed between each network-connected thermostat and the central server(s) for providing a variety of advantageous functionalities such as facilitating remote control, reporting weather data, reporting HVAC control data and status information, and providing the centralized and/or partially centralized controlling and data communications required to carry out the DR-related, time-of-use (TOU)-related, and/or real-time pricing functionalities described herein.

It is to be appreciated that although some embodiments herein may be particularly suitable and advantageous for commercial scenarios in which (i) the cloud service provider(s) associated with the population of network-connected thermostats is/are also the provider(s) of the described energy management system, (ii) the provider(s) of the energy management system are separate and distinct business entities from the utilities themselves, and (iii) the energy management system is provided as a value-added service to the utilities, the scope of the present description is in no way limited to such scenarios. In other applicable scenarios, for example, all of the elements can be provided by the utility. In other applicable scenarios, some of the elements can be provided by the utility while other elements can be provided by a governmental entity or by miscellaneous combinations of disparate cooperating businesses or consortia. Prior to a DR event, based on a wealth of information the energy management system possesses regarding the residences it is managing, the energy management system can effectively predict how much energy a residence is likely to consume over an given period, such as over a DR event. Moreover, given the wealth of information regarding the residences, the energy management system may also generate variations to the residence's baseline thermostat setpoints that can be implemented during the DR event period. The variations can be made so that that the residence consumes less energy over the DR event period. Further yet, because of this wealth of information the energy management system has regarding the residences, the energy management system may also accurately predict the amount of energy likely to be reduced over the DR event period or, in other words, shifted from the DR event period to one or more time periods outside (e.g., shouldering) the DR event period.

The described provisions for such energy consumption prediction and management brings about many advantages as described further hereinbelow. For example, not only does it allow the energy management system to effectively manage the energy consumption of a number of connected residences, but it also allows the energy management system to intelligently select a subset of residences from a large pool for participation in DR programs or events. The physical characteristics of residences and habitual tendencies of occupants of those residents vary widely across regions, and thus the potential energy savings/shifting also varies widely. The energy management system disclosed herein may intelligently choose the participants in an energy savings program to maximize efficiency and minimize costs.

As the energy management system disclosed herein provides advantageous insight into energy-related characteristics of various residences on both individual and aggregate levels, the energy management system may also provide portals so that other interested parties, such as utility companies, may similarly have access to such information. As it is generally in the interests of the utility company to reduce energy consumption over a particular time period, the utility company similarly has interests in accessing such energy-related characteristics of the various residences individually and in the aggregate so as to more efficiently and effectively generate and manage DR events. Accordingly, in some embodiments, a utility portal is disclosed that enables the utility provider access to consumer-level energy-related information at a variety of levels of detail and complexity, for facilitating both economically smart and environmentally responsible decision making on resource planning and utilization.

The specifics of these and other embodiments are further disclosed herein, and a further understanding of which can be appreciated with reference to the figures. FIG. 8 depicts a system 800 for managing demand-response programs and events according to an embodiment. System 800 includes a plurality of electrical power generators 810A-810N, a utility provider computing system 820, an energy management system 830, a communication network 840, a plurality of energy consumer residences 150A-150N, and a power distribution network 860.

Electrical power generators 810A-810N are operable to generate electricity or other type of energy (e.g., gas) using one or more of a variety of techniques known in the art. For example, electrical power generators 810A-810N may include hydroelectric systems, nuclear power plants, fossil-fuel based power plants, solar plants, wind plants, gas processing plants, etc. The amount of electricity that may be generated at any given time may limited to some maximum energy supplied that is determined by the generators 810A-810N. Further, the electrical power generators 810A-810N may be owned and managed by a utility provider implementing the utility provider computing system 820, or may be owned and/or managed by one or more third party entities that contract with the utility provider to provide source energy to customers of the utility provider.

Utility provider computing system 820 is a computing system operable to communicate with one or more of the electrical power generators 810A-810N, the energy management system 830, and in some embodiments electronic systems in one or more of the residences 150A-150N. The utility provider associated with the utility provider company system 820 typically manages the distribution of electricity from the electrical power generators 810A-810N to energy consumers at the residences 150A-150N. This management includes ensuring the electricity is successfully communicated from the power generators 810A-810N to the residences 150A-150N, monitoring the amount of energy consumption at each of the residences 150A-150N, and collecting fees from occupants of the residences 150A-150N in accordance with the their respective monitored amount of energy consumption. The utility provider computing system 820 may perform one or more of the operations described herein, and may include a variety of computer processors, storage elements, communications mechanisms, etc. as further described herein and as necessary to facilitate the described operations.

Energy management system 830 is a computing system operable to intelligently and efficiently manage the energy consumption at one or more of the residences 150A-150N while optionally providing reporting and control mechanisms to the utility provider computing system 820. The energy management system 830 may be operable to engage in real-time two-way communications with electronic devices associated with the residences 150A-150N via the network 840, as well as in engage in real-time two-way communications with the utility provider computing system 820. In one particular embodiment, the energy management system 830 may be operable to reduce the aggregate amount of energy consumed at the residences 150A-150N so that the aggregate energy demand does not exceed the maximum energy supply limits of the power generators 810A-810N. Such reductions may be achieved during any suitable time period through the day. For example, such reductions may be achieved during a demand-response (DR) event communicated by the utility provider computing system 820. The energy management system 830 may perform one or more of the operations described herein, and may include a variety of computer processors, storage elements, communications mechanisms, etc. as further described herein and as necessary to facilitate the described operations.

Network 840 is any suitable network for enabling communications between various entities, such as between one or more components of the energy management system 830 and one or more electronic devices associated with one or more of the residences 150A-150N. Such a network may include, for example, a local area network, a wide-area network, a virtual private network, the Internet, an intranet, an extranet, a public switched telephone network, an infrared network, a wireless network, a wireless data network, a cellular network, or any other such wired or wireless network(s) or combination(s) thereof. The network 840 may, furthermore, incorporate any suitable network topology. Network 840 may utilize any suitable protocol, and communication over the network 840 may be enabled by wired or wireless connections, and combinations thereof.

Residences 150A-150N are a variety of structures or enclosures that are associated with energy consumption. The structures may be span a variety of structure types, such as private residences, houses, apartments, condominiums, schools, commercial properties, single or multi-level office buildings, and/or manufacturing facilities. A number of examples described herein refer to the structure as being a private residence in the form of a house, but embodiments are not so limited as one skilled in the art would understand that the techniques described herein could equally be applicable to other types of structures. It is to be appreciated that, while some embodiments may be particularly advantageous for residential living scenarios, the scope of the present teachings is not so limited and may equally be advantageous for business environments, school environments, government building environments, sports or entertainment arenas, and so forth. Thus, while many of the descriptions below are set forth in residential living context, it is to be appreciated that this is for purposes of clarity of description and not by way of limitation.

The residences 150A-150N typically include one or more energy consumption devices, which could be electrical energy consumption devices such as televisions, microwaves, home audio equipment, heating/cooling systems, laundry machines, dishwashers, etc. Similarly, energy consumption devices could include one or more other types of energy consumption devices such as gas consumption devices. For example, the residences 150A-150N may include a natural gas (air/water/etc.) heater, stove, fireplace, etc. The residences 150A-150N in many embodiments include an intelligent, network connected thermostat that is operable to control the thermal environment of the residence. The thermostats may be considered to part of the energy management system 830, in that much of the processing subsequently described herein may be performed by computing systems at the energy management system 830 or by the thermostats themselves. Alternatively, the thermostats may be considered separate from the energy management system 830 due to their remote geographical location with respect to other components of the energy management system 830. In either case, electronic devices associated with the residences 150A-150N may perform one or more of the operations described herein, and may include a variety of computer processors, storage elements, communications mechanisms, etc. as further described herein and as necessary to facilitate the described operations. While most embodiments are described in the context of situations where it is desired to reduce the temperature inside of the structure (e.g., during a hot summer), similar principles apply (just applied in the opposite) in situations where it is desired to increase the temperature inside of the structure (e.g., during a cold winter). For some embodiments, some or all of the intelligent, network-connected thermostats may be the same as or similar in functionality to the NEST LEARNING THERMOSTAT® available from Nest Labs, Inc. of Palo Alto, Calif.

Power distribution network 860 is any suitable network for transferring energy from one or more of the electrical power generators 810A-810N to one or more of the residences 150A-150N. In an electrical distribution network, power distribution network 860 may include a variety of power lines, substations, pole-mounted transformers, and the like as known in the for carrying electricity from the electrical power generators 810A-810N to the residences 150A-150N. In a gas distribution network, power distribution network 860 may include a variety of compressor stations, storage elements, pipes, and the like for transporting natural or other types of energy producing gas from the power generators 810A-810N (in this embodiment, gas wells and/or processing plants) to the residences 150A-150N.

System 800 in certain embodiments is a distributed system for managing demand-response programs and events utilizing several computer systems and components that are interconnected via communication links using one or more computer networks or direct connections. However, it will be appreciated by those skilled in the art that such a system could operate equally well in a system having fewer or a greater number of components than are illustrated in FIG. 8. Thus, the depiction of system 800 in FIG. 8 should be taken as being illustrative in nature, and not as limiting the scope of the present teachings.

Dispatch Engine

The embodiments described herein may begin by scheduling electrical load usage across a variety of electrical devices (storage, electric vehicles, HVAC systems) or across a plurality of structures in a way that simultaneously minimizes overall energy costs, allows participation in load-shedding capacity markets, and maintains a comfortable environment for end-users. These embodiments may employ a centralized approach appropriate for control of a (i) large commercial or university campus, or (ii) a large collection of individual structures. These embodiments may operate on a time-scale of minutes, dispatching schedules to devices/structures under management that incorporate current information, as well as best available predictions. In what follows, a general framework is developed to describe how device models for energy storage, electric vehicles, and/or HVAC systems fit into this approach and to describe cost functions corresponding to a typical commercial power bill and participation in DR programs.

A feature of what is referred to herein as a Model Predictive Control (MPC) scheduler is the includes incorporation of predictions for various important quantities (e.g. uncontrolled device loads, EV driver availability, thermal response of buildings, etc.) For the purposes of the simulations described below, relatively simple predictions are considered, as they have been shown to be sufficient for responding to DR events while efficiently minimizing required computing power. This approach can be applied to scheduling various electrical load combinations with the simultaneous goals of reducing electricity costs, supporting the grid through DR support, and keeping end-users happy.

The following description includes mathematical notation that will be readily understood by one having skill in the art. Specifically, the following description shows how to set up equations used by a dispatch engine to properly describe the optimization problem for selecting individual electrical loads to combine during a DR event. Once this optimization problem is formulated, it can be solved in many different ways, such as using a general linear solver or a "greedy" algorithm that will be described in greater detail below.

Formally, define $u_1, \ldots, u_n$ to be the power consumption of n devices with $u_i \in \mathbb{R}^T$ denoting the average power consumption of device i over a time horizon of length T. The convention can be adopted that $(u_i)_t < 0$ signifies that a device (e.g., a battery) generates rather than consumes electricity during this time interval. For the problem scales of interest, $(u_i)$ typically will have units in kW and define $\Delta$ to be the time constant corresponding to the length of the interval such that $(u_i)$ corresponds to kWh's. As a reference point, time horizons over 12+ hours can typically be considered to cover an entire work day, and time intervals of 5 minutes to allow for sufficiently fine-grained control.

In addition to power consumption, each device also has internal state $x_i \in \chi^T$, which describes relevant device-specific quantities. For an HVAC system, this could include internal building temperatures. For an electric vehicle (EV) charging station, this might include a maximum charging rate and a required energy for the currently charging EV. These variables can be important in modeling the impact of power consumption on devices and users, such as changes in internal temperature due to HVAC power consumption.

A power schedule can be produced for all devices by solving an optimization problem over these $x_1, \ldots, x_n$ and $u_1, \ldots, u_n$ variables, $$\text{minimize } f(x_1, \ldots, x_n, u_1, \ldots, u_n) \quad (1)$$

$$\text{subject to } g_i(u_i, x_i) \leq 0 \text{ for } i=1, \ldots, n$$

where the f objective can include both well-known energy costs (e.g., time-of-use charges, demand charges, demand-response penalties) as well as softer costs (e.g., user satisfaction). The $g_i$ terms may define hard constraints due to physical limitations (battery capacity) or due to hard user constraints (e.g., the EV must have 5 kWh by 5 pm). Note that while $u_1 \ldots u_n$ denotes the scheduled power for each device over the entire time horizon, as is standard in model predictive control, only the first action in this schedule needs to be executed, then the optimization problem can be resolved again with updated information in the next interval.

Next, the details of terms in the cost function f are described that depend only on power consumption $u_1 \ldots u_n$, and thus make up the utility power bill as well as determine revenue from participating in DR programs. There are essentially two types of cost functions: those that depend on a pre-defined rate plan and that are applied at the meter level, and those based on capacity events that are declared days or hours in advance. Furthermore, whereas the most basic energy charges are additive and thus can be separated at the individual device or structure level, demand charges and capacity events lead to nonlinear functions that apply to a group of devices or structures simultaneously (e.g. all devices behind a single meter) leading to an overall cost function that applies at different levels of granularity. In what follows, cost functions are described for the most common rate plan charges (i.e., time-of-use energy charges, and demand charges) as well as for capacity events.

The most basic of electricity costs is a fixed time-of-use charge applied to the amount of energy used at a particular time at a given device or structure. This cost function decomposes over the individual devices and $$f_{TOU}(u_1, \ldots, u_n) = \sum_{i=1}^{n} f_{TOU}(u_1, c_i^{TOU}) \quad (2)$$

where $c_i^{TOU}$ denotes the time of use charge for each individual device. For each device, the energy charge for the rate plan combined with the amount of energy used by the device at that time is given by, $$f_{TOU}(x;c) = \Delta x^T c \quad (3)$$

where $\Delta$ represents the appropriate constant for converting average power in kW to energy in kWh. For example, h=5/60 if the time interval for scheduling is 5 minutes.

Like the time of use charges, demand charges can also be codified in the rate schedule for a particular meter. These charges are a rough proxy for utility costs that are incurred due to higher peak power usage. Of course, they only roughly approximate the true utility cost because the peak for an individual meter may not correspond exactly to the peak for the overall grid. Nonetheless, these charges are a significant component of the monthly bill for many rate plans and thus an important term to minimize.

For demand charges, groups of devices can be considered that are behind a particular meter. Additionally, for the same group of devices, there may be several demand charges that apply over different periods of the scheduling window. For example, scheduling beginning at 9 AM in a summer month, some embodiments may need to consider peak demand charges that are active during the middle of the day, as well as partial peak charges that are active in the morning hours. This can be written as a sum over the demand charges, where each demand charge is determined by the sum of individual devices within that group, such as all devices behind a single meter, $$f_{DC}(u_1, \ldots, u_n) = \sum_k f_{DC}\left(\sum_{i \in D_k} u_i + \ell_k; m_k, c_k^{(DC)}\right) \quad (4)$$

where $l_k$ denotes the predicted power consumption for uncontrolled devices behind the same meter, $m_k$ represents maximum power consumption thus far in the billing period, and $c_k^{(DC)}$ denotes the demand charge rate from the rate plan denominated in $/kW. For each individual meter, the incremental cost incurred can be determined by the amount we increase the maximum power consumption, given by $$f_{DC}(x;m,c) = c \max\{u_1 - m_1, \ldots, u_T - m_T\}. \quad (5)$$

Unlike time of use and demand charges, capacity events are not fixed in the rate structure, and are instead declared by grid operators with some advanced notice. Typically, participants self-nominate or bid on a particular load capacity that can be shed on demand in order to support the grid. In order to quantify the amount of demand reduction during a capacity event, a baseline methodology may be used to define the power consumption under "normal" conditions. For example, a 10-day average, excluding weekends and holidays, may be considered and adjusted for day-of power consumption prior to the event.

The goal of this term in the scheduler is to ensure that after events are declared, loads are scheduled in a way that minimizes energy cost due to penalties incurred from not supplying the pre-agreed capacity. These events are typically defined at a relatively coarse granularity that includes multiple meters, but as with demand charges, groups of loads can be enumerated that are relevant for a particular event and the sum of all devices in these groups can be considered together as $$f_{DC}(u_1 \ldots, u_n) = \sum_k f_{DC}\left(\sum_{i \in C_k} u_i + \ell_k; b_k, p_k\right) \tag{6}$$

where $b_k$ denotes the baseline, $p_k$ denotes the nominated capacity. The actual penalty function for an event depends on the program in question and can include quantities such as the price to purchase capacity in the real-time energy markets. One example is a non-symmetric cost function with significant penalties for under performance and limited/no upside for shedding more capacity than is required. A simple example places a linear penalty on under-delivering given by $$f_{DR}(x;b,p) = c^T(x-b-p) \tag{7}$$

where $c \in \mathbb{R}^T$ is the penalty in \$/kW. Extending this to more complicated penalty functions would be straightforward in light of this disclosure for one having skill in the art.

Next device models for energy storage devices, electric vehicles, and HVAC systems are described. These constraints are determined by known physical properties (e.g., a lithium-ion battery with a 50 MWh capacity and a 10 MW charge/discharge rate) as well as predictions of physical properties (e.g., weather forecasts, arrival and departure of electric vehicles). Constraints can also be used to incorporate user preferences (e.g. vehicle must have 5 kWh of charge by 5 p.m. or building temperature must between 70°-74° F.), ensuring that the optimal schedule respects the needs of electricity consumers. Alternatively, preferences may be incorporated through additional terms, but this introduces a tradeoff between energy costs and user happiness. By instead making these hard constraints, the assumption that maintaining user happiness is more important than reducing energy costs can be encoded.

First, a dedicated energy storage device, such as a lithium-ion battery, may be considered. The constraints for these devices may take into account the maximum charge/discharge rate and the physical constraints on battery capacity $$0 \le e_0 + \Delta \sum_{t=1}^k u_t \le e_{max} \text{ for } k = 1, \ldots, T \tag{8}$$

$$r_{min} \le u_t \le r_{max} \text{ for } t = 1, \ldots, T$$

where $e_0$ is the initial energy stored in the battery, $e_{max}$ is the maximum capacity measured in kWh, and $r_{min}$ and $r_{max}$ are the maximum charge/discharge rates. The first constraint ensures that the total energy remains within the capacity of the battery, while the second constraint bounds the charge/discharge rate at each time interval. Recall that the convention that $u_t < 0$ represents sourcing of power, such as discharging the battery.

Next, consider the scheduling of electric vehicles, which are essentially small energy storage devices that arrive and depart at various times. It can be assumed that EVs do not support bidirectional power flow, but the extension to this case is straightforward. From the perspective of the grid, when scheduling electric vehicle charging stations, a model can be where EV drivers specify their preferences to the scheduler in terms of desired departure time and charge when they plug in ("I need 5 kWh by 5:30 pm"). This leads to the constraints $$0 \le e_0 + \Delta \sum_{t=1}^k u_t \le e_{desired} \text{ for } k = 1, \ldots, T_{depart} \tag{9}$$

$$0 \le x_t \le r_{max} \text{ for } t = 1, \ldots, T_{depart}$$

where the user has specified a need for $e_{desired}$ charge by $T_{depart}$, $e_0$ is the current state of the battery, and $r_{max}$ corresponds to the maximum EV charging rate (e.g., 6.6 kW for standard Level 2 charging). In the case that $e_0$ is not observed (e.g. battery state may be unknown when the EV driver begins charging), the initial battery state can be estimated from historical data or conservatively take $e_0=0$. Additionally, when an EVSE is empty or no user constraints are specified, the expected arrival, depature, and required charge can also be estimated from historical data. Note that EV battery controllers slow their charging rate as the battery becomes full, and thus EVSE implementations may communicate with the scheduler to adjust $r_{max}$ as appropriate, setting $r_{max}=0$ when the battery is completely full.

Controlling an HVAC load requires a slightly more complicated model able to specify the relationship between power consumption and internal building temperatures. A linear model may be adopted having the state variables $x_t$ representing the internal building temperature with $$x_{t+1} = x_t + a(T_t^{external} - x_t) + bu_t \tag{10}$$

where a and b are physical constants representing the thermal properties of the building and cooling efficiency, respectively. User preferences can be incorporated as constraints in the model on internal building temperatures in the range of $T_{min} \le x_t \le T_{max}$. For example, occupants of an office building may expect temperatures in the range 70°-74° F. under normal circumstances, but may be willing to tolerate slightly higher temperatures for short periods during capacity events. Note that commercial building management systems may have their own sophisticated control systems that maintain desired set points in application-specific ways. The output of the scheduler can be mapped to these systems as a post-processing step and/or by incorporating more application-specific details and state in the constraints.

To schedule various loads from a plurality of electrical loads for use in energy reduction, the equations and constraints described above can be used as inputs to a linear solver. In some embodiments, an algorithm referred to herein as a "Greedy Tetris" scheduler may be used to schedule different customers' load drop flexibility to achieve a desired aggregate load drop shape in magnitude and time.

This algorithm begins with two assumptions: (1) each customer or structure can be represented by a time-series of how much they can drop in a given time interval, and for how many time intervals such a drop may occur; and (2) once a customer is dispatched, the dispatch will not stop and restart at another time during the same event. Market rules vary by location and ISO/utility, but here it will be assumed that there is no incentive to over-perform, i.e. to drop more load than was committed up front. An extension for exception cases will be introduced below.

Figure 9:
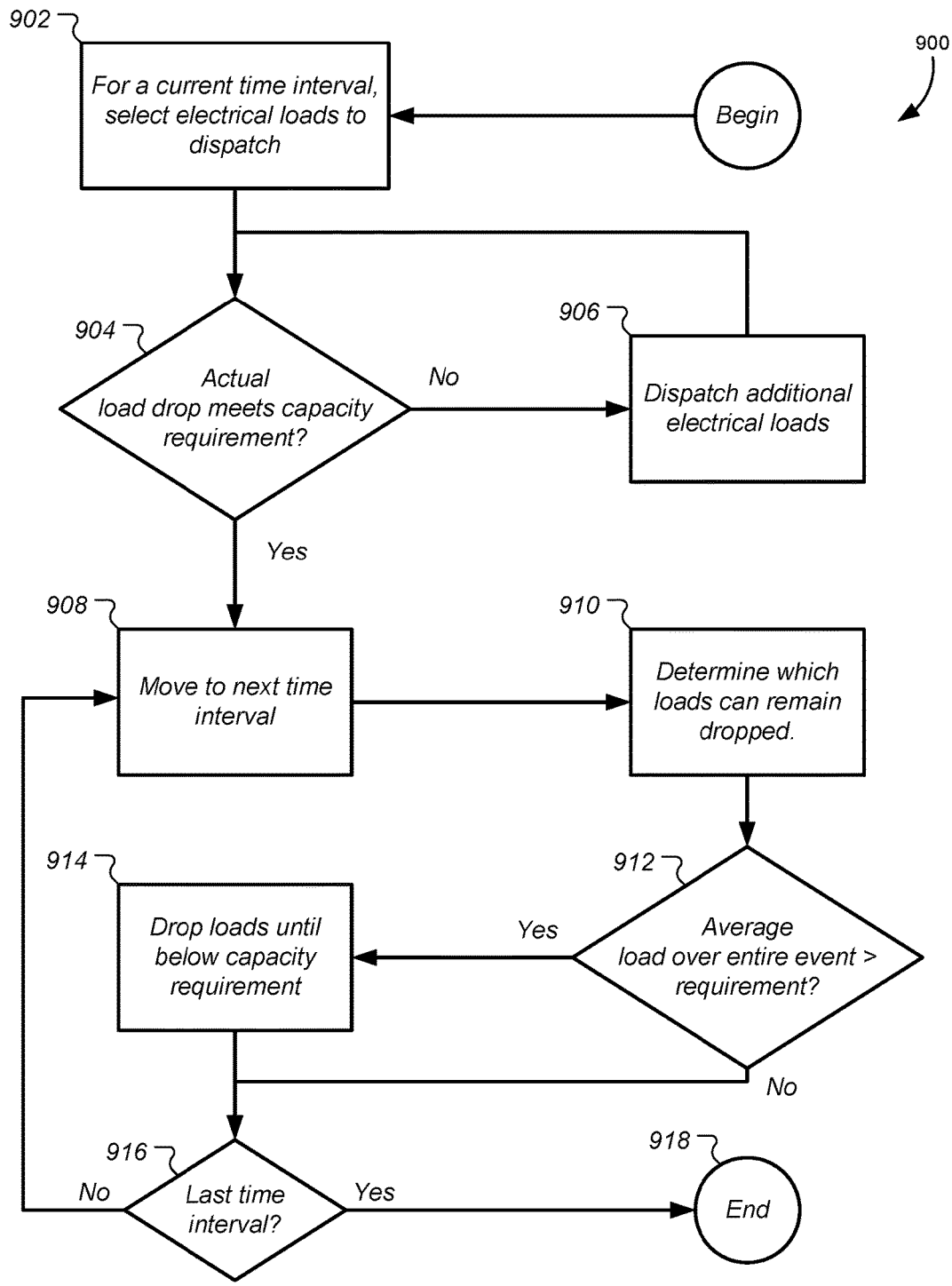
FIG. 9 illustrates a flowchart of a method for scheduling individual loads for a load-drop event, according to some embodiments.

FIG. 9 illustrates a flowchart of a method for scheduling individual loads for a load-drop event, according to some embodiments. The method may include, for a first time interval of a load-drop event, selecting available loads to dispatch (902). This initial selection of loads to dispatch may be selected such that there is just enough estimated load drop to meet required capacity that was committed by the energy management system. The first time interval may refer to a unit of performance evaluation, which could be a fixed time interval, such as an hour, or a duration of the entire load-drop event. The initial selection of loads may be calculated by aggregating individual load drops from each load until the required capacity is reached.

The method may also include determining an actual load drop during the first time interval using the initial selection of loads, and determining whether the actual load drop meets the capacity requirement (904). If the actual load drop does not meet the capacity requirement, the scheduling system can dispatch additional electrical loads until the actual load drop meets the capacity requirement (906). These two steps of the process may be repeated during the current time interval as needed. It will be understood that the actual load drop can fluctuate during the current time interval due to customer interactions with their thermostat. When the current time interval is completed, the algorithm can move on to a subsequent time interval (908).

During a subsequent time interval (908), a determination can be made as to which loads from the previous time interval can remain dispatched and which loads cannot remain dispatched (910). Some customers may limit the length of time that they are willing to shed electrical load during a demand-response event. Other thermostat/HVAC system combinations may simply not shed enough load to make their continued inclusion in the load shedding pool worthwhile. Similar to step 902 above, additional electrical loads can be added until the estimated load drop during the subsequent time interval meets the capacity requirement. After the initial selection of electrical loads during the subsequent time interval, a rebalancing process can be instituted similar to steps 904, 906 above. However, during a subsequent time interval, additional loads need not be added until the capacity requirement is exceeded. Because previous time intervals may guarantee that the actual load exceeds the capacity requirement, continuously exceeding the capacity requirement throughout the entire event will over commit, and thereby shed more capacity than is required. Instead, some embodiments may determine whether an average load over the entire event is greater than the capacity requirement (912). If so, electrical loads during the subsequent time interval may be dropped until the actual load during the subsequent time interval is below the capacity requirement (914). It will be understood that steps 912, 914 can also determine whether the average over the entire event is less than the capacity requirement, and then add additional loads in response.

For each subsequent time interval, a rebalancing process as described above can be used to maintain an average load dispatch over the entire event that is approximately equal to the capacity requirement. As each subsequent time interval expires, the scheduling system can move to the next time interval (916), again determine which loads can remain dropped (910), and rebalance loads according to the average load drop over the entire event in relation to the capacity requirement (912, 914). After the last time interval (916), the event will end, and analysis can be performed regarding the efficiency of the scheduling algorithm described above.

This general scheme works regardless of whether event performance is judged in discrete intervals, or averaged over the entire event. It is also not dependent on knowing the duration of the event ahead of time. This algorithm is simple and fast, and requires little in the way of computing resources. Although it uses rebalancing, and is not necessary optimal in all cases, this algorithm avoids extensive forward-looking planning. If load-shedding rules include some incentive for over performance (e.g., extra payments for shedding more electrical load than agreed to upfront) then the algorithm of FIG. 9 can be modified by identifying the optimal drop level to be reached, based on a trade-off of expected payout versus costs. "Cost" in this sense can be represented as the cost of dispatching more customers in terms of user satisfaction. Once the optimal drop level has been determined, the greedy algorithm of FIG. 9 can proceed as described above, using the optimal drop level instead of the agreed-to capacity requirement.

Bidding Engine

The dispatch engine described above may be responsible for generating an optimal dispatch schedule given a DR event start time and the constraints that apply to each load (e.g., each home with a customer having a smart thermostat). This optimization performed by the dispatch engine they provide at least two benefits. First, the expected payout for the given event performance may be calculated by using the DR program rules in conjunction with the specific energy-saving characteristics of the grouping of loads provided by the dispatch engine. Second, a significant amount of flexibility may be realized during and after a given event. This flexibility can be potentially used to dispatch into energy markets, so it also carries some real-world monetary value.

The bidding engine and the load models described above allow a thermostat management server to predict and simulate how different load combinations will perform during future DR events. Parameters can be changed during a simulation to find an optimized combination of loads for given DR program rules. This can be beneficial when energy companies require estimated energy savings prior to DR events. In some arrangements, an energy company may place certain future DR events up for bid among various load-saving customers. For example, a utility company may ask for a 4 MW reduction during a certain date/time. When submitting a bid to provide the required energy reduction, the thermostat management server can calculate the likelihood that the thermostat network will be able to shed the required amount of energy based on simulating various load configurations returned by the dispatch engine described above. These simulations can provide an expected energy savings, along with a statistical risk associated with accepting the utility provider's request. As described above, most utility providers do not offer monetary incentives for overestimating the amount of energy reduced. However, most energy providers do charge monetary penalties for underestimating the amount of energy reduced. Therefore, it may be beneficial for the thermostat management server to determine the optimal combination of loads using the dispatch engine to shed as closely as possible the required amount of energy by the utility provider.

Figure 10:
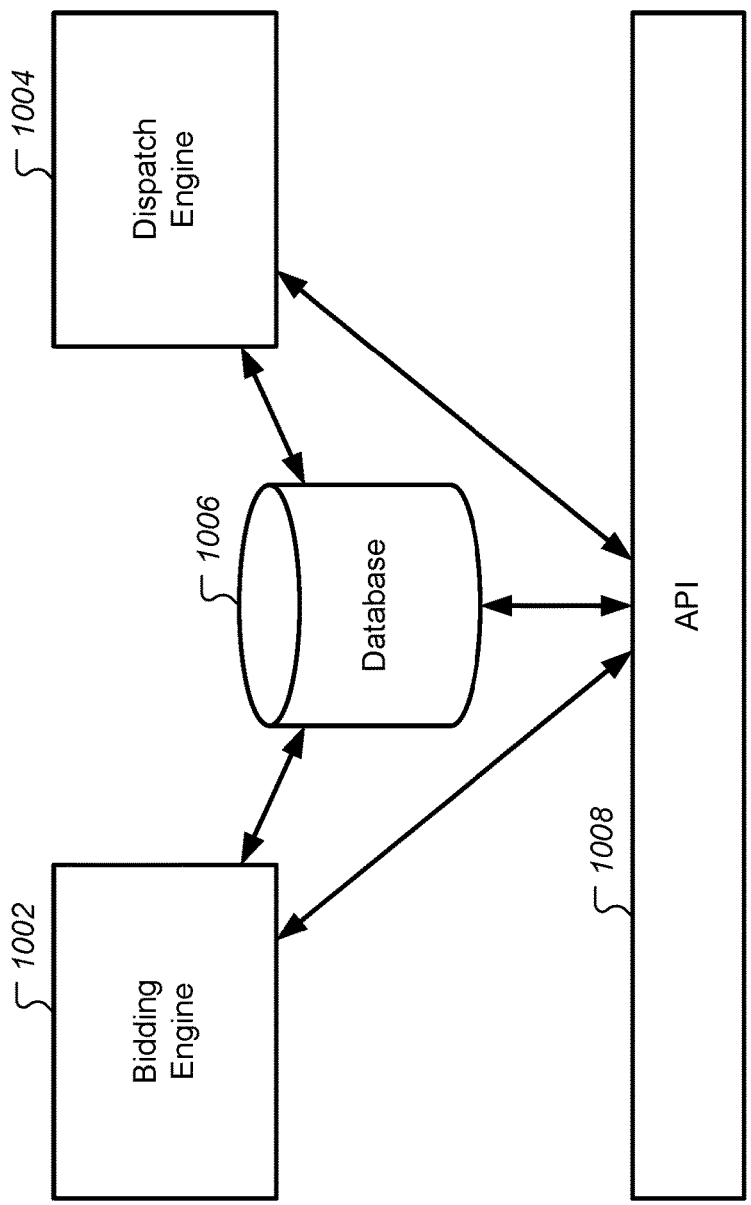
FIG. 10 illustrates a system diagram of a thermostat management server that includes the dispatch engine and bidding engine, according to some embodiments.

In order to identify the optimal combination of loads and provide a statistical risk score for each load configuration, a bidding engine can be used in conjunction with the dispatch engine to perform such simulations. FIG. 10 illustrates a system diagram of a thermostat management server that includes the dispatch engine and bidding engine, according to some embodiments. The dispatch engine 1004 and the bidding engine 1002 represent the major functional blocks of the load-shedding system. The bidding engine 1002 may be responsible for determining how much capacity should be nominated for each of the demand response resources. The dispatch engine 1004, in turn, can schedule individual assets of a resource during demand response events. Information regarding each of the assets/resources (e.g., thermal characteristics of homes, HVAC capacities, etc.) can be stored in a database 1006 at the thermostat management server. An API 1008 can connect assistant to external computer systems, such as the utility provider computer system. The API 1008 can also source thermostat-level information, events, and dispatch the actual system instructions for individual thermostats.

Figure 11:
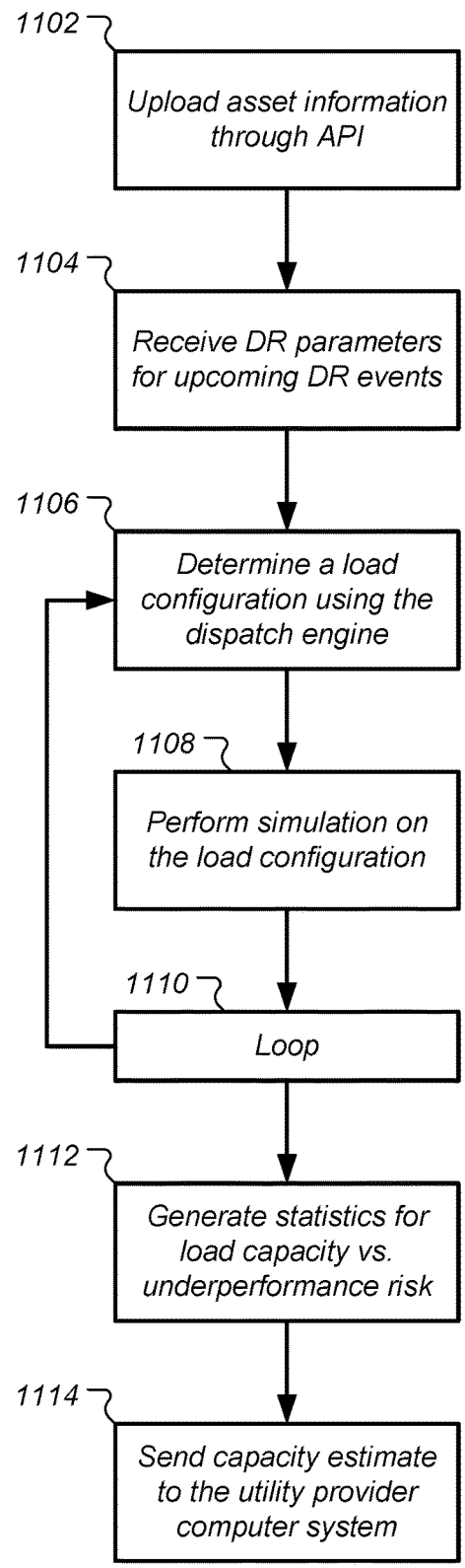
FIG. 11 illustrates a flowchart of a method for estimating an optimal amount of load capacity to agree to shed during future DR events, according to some embodiments.

FIG. 11 illustrates a flowchart of a method for estimating an optimal amount of load capacity to agree to shed during future DR events, according to some embodiments. The method may include uploading information about assets and resources, such as their load flexibility, through the API into the database (1102). This information may be uploaded constantly and/or periodically from thermostats in operation in various homes. The method may also include receiving DR parameters for upcoming DR events (1104). This information may be provided by the utility provider computer system, and may generally describe DR events during an upcoming season. For example, this information may request an amount of energy to be shed, along with start times, end times, durations, locations, and so forth.

The method may additionally include a simulation loop performed by the bidding engine, the details of which will be described further below. Within this loop, the dispatch engine can determine a load configuration to be simulated, such as a grouping of homes having smart thermostats installed therein (1106). The bidding engine can perform, for example, a Monte Carlo simulation to estimate the amount of load to be shed using that configuration based on varying weather conditions, energy prices, and so forth (1108). This loop (1110) can be performed using many different configurations selected by the dispatch engine.

After the bidding engine has performed the simulations above, the method may include generating a set of statistical data relating the load capacity shed to the risk of underperformance when agreeing to service the DR events (1112). In an example described below, the statistical information may include a set of curves showing an expected value, a $10^{th}$ percentile value, a $90^{th}$ percentile value, and so forth. The statistical information can be provided to the thermostat management system, which can then make a decision as to how much load can be reliably shed based on a desired level of risk. Once the load shedding capability has been determined, the method may include sending the estimate of the capacity to shed load during the future DR events to the utility provider computer system (1114).

What follows is an illustration of how the bidding engine can generate a set of statistical data that can allow the thermostat management server to determine the optimal amount of load that can be shared during DR events. This approach incorporates (i) a statistical categorization of the drop in energy consumption with respect to a monetized baseline as reported to the utility providers that run the demand response programs, and (ii) a way to use these models with the inherent uncertainty in weather forecasts within a Monte Carlo simulation framework that provides capacity nomination versus payout curves. These embodiments use models of uncertainty to generate many instances, or sample paths, for future monthly demand response event realizations. These models then compute the actual payout outcomes of these different realizations. The result of this analysis is a set of distribution curves as a function of the upfront capacity nomination.

Characterizing the drop in energy consumption with respect to the utility-reported baseline is one parameter in estimating the ability to respond when the demand response event is called. The key challenges in implementing this procedure were in the amount of uncertainty (noise) that was present in this process. Therefore these embodiments required an approach that placed special attention on how the estimation noise is reduced. The capacity drop analysis was broken down into two components: (i) the difference between the predicted baseline vs the utility-based (monetization) baseline, and (ii) the drop of the actual demand with respect to the predicted baseline (instead of the utility-based baseline). These embodiments have been shown to efficiently control the noise in the estimation procedure, which may be important given the typically very limited DR event history. All the applied methods were statistically rigorous. This is the only known approach that incorporates noise and provides the risk-averse strategy in coming up with the DR program nominations.

First, the approach in estimating the drop includes estimating a difference between the actual load during the demand response event and the utility baseline based on which the resource is monetized. Predicting this quantity can be challenging due to the inherent uncertainty of the utility baseline and the fairly small number of available demand response events that can be used to build the capacity drop prediction model. The noise can be limited in the capacity drop estimation by exploiting the following equality.

$$(B(t)-A(t))I_{DR(t)}=(B(t)-P(t))+(P(t)(1-I_{DR(t)})-A(t)I_{DR(t)}) \qquad (10)$$

A(t) represents the actual power at time t, B(t) represents the utility baseline at time t, P(t) represents the baseline prediction at time t, DR(t) represents the DR state at time t, and $I$ represents an indicator function. Note that the first term in (10) does not depend on the demand response event. Instead, it represents the difference between the utility baseline and the corresponding prediction, and the model can be built using all of the available historic data. On the other hand, the second term in (10) depends on actual DR events, and the estimation uncertainty stems from a commonly small number of events, as well as the uncertainty in demand and weather forecasts. Bid nominations are usually registered at least a month ahead. However, in general, month-ahead predictions are very noisy especially for loads that depend on the outside temperature, such as HVACs.

Assigning loads to a DR program depends on the ability of the utility baseline to track actual load. The drop of the actual demand with respect to the utility provided baseline is noisy. Thus, the estimation noise can be controlled by considering the terms in (10) separately, while adding the correlation between the two terms. However, the drop with respect to the predicted power exhibits a more clear trend as a function of outside temperature and the power prediction. This is due to the fact that the trained power prediction algorithms take into account many more effects than the utility's baseline procedure. There is a limit to what can be done in predicting the utility baseline—it is always going to be noisy to some degree—unless the demand cab be controlled to reduce the load variability. To that end, the estimation can be optimized by focusing on the DR-likely days, including the actual event days. Using a Principle Component Analysis (PCA), the historical information can be used to identify warm days with similar daily consumption profiles.

In order to predict the DR capacity drop with respect to the predicted power during the DR event, uncertainty in predicting the drop depends on different factors, such as the DR event frequency and the data availability (e.g., power data, temperature forecasts). A differentiation can be made between models that (i) capture the DR state and its duration, and directly provide drop estimate, and (ii) exploit clustering techniques to improve predictions accuracy. In some embodiments, a linear model can accept temperature and weather conditions, time of the week, day of week, and DR related states as inputs. One way to improve the drop prediction accuracy is by focusing only on the event days. Note that the drop is a function of the time of day, which can be excluded from the analysis below, since DR events are almost always triggered at the same time.

Figure 12:
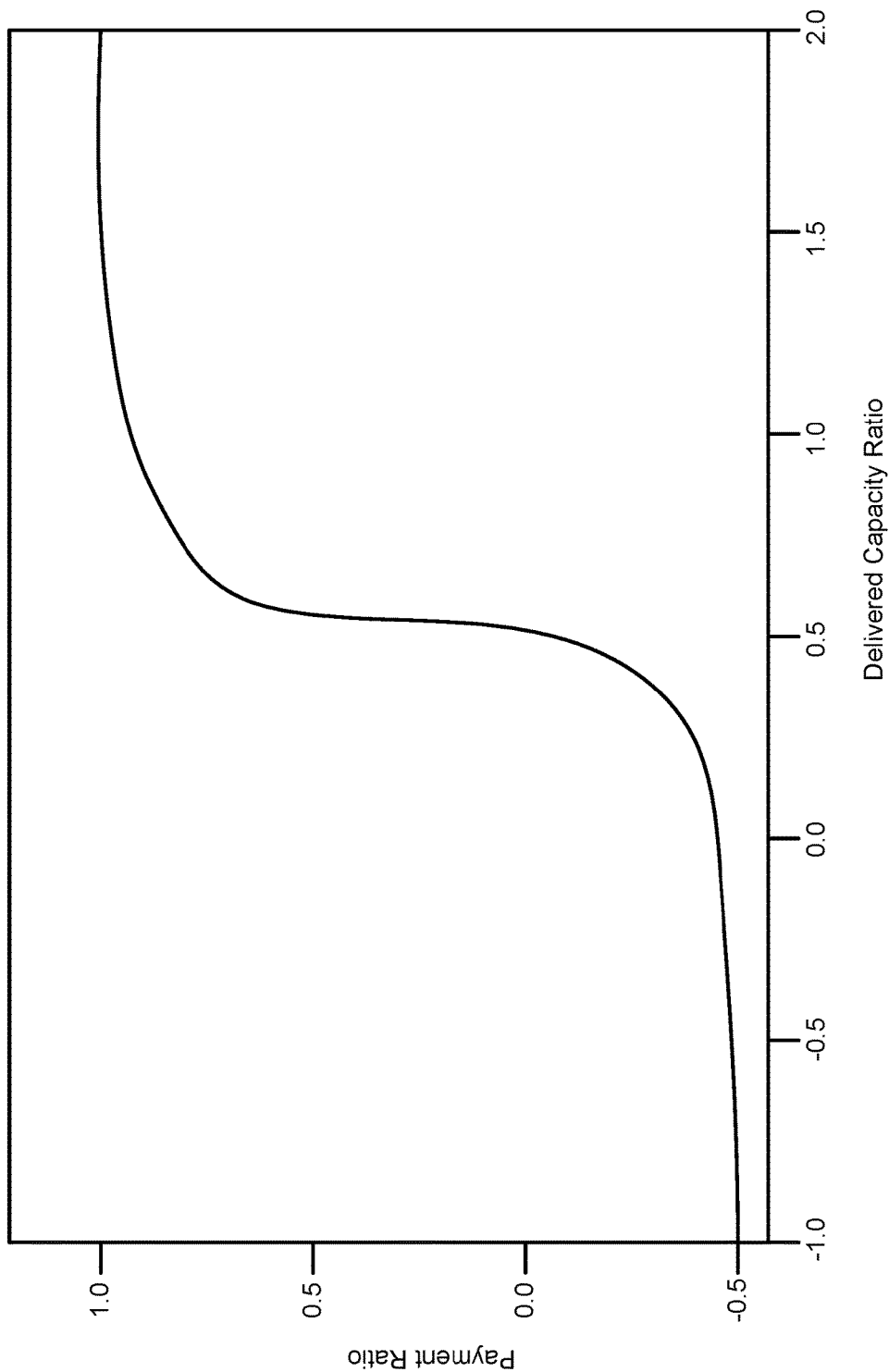
FIG. 12 illustrates a graph of a penalty based on a delivered capacity ratio.

With the capacity estimation process established above, the system can then execute a risk-aware bidding procedure. Each DR program has a payout that is a function of $B(t)-A(t)$ at times for which $DR(t)=1$, along with other factors, such as month of the year, type of the program ("day ahead" or "day of"), and so forth. There are two concepts that characterize the available payments. The first is the payment ratio based on the delivery ratio. In other words, each month, a certain DR capacity can be nominated. The performance achieved during the DR event (i.e. actual drop from baseline) relative to the nominated capacity is the delivered capacity ratio. The payment or penalty based on this delivered capacity ratio is shown in FIG. 12. Note that the Payment Ratio levels off as the Delivered Capacity Ratio increases, leveling off at a ratio of 1.0. This signifies that there is no benefit to over estimating the capacity reduction.

This capacity payment determined by the Payment Ratio is a function of a random process of hourly event drops throughout a given month. In order to evaluate its behavior, a Monte-Carlo simulation can be used. N monthly samples can be generated (i.e., sequences of monthly event drops) using the previously discussed prediction models. Given the selected DR nomination value, the quantile values can be estimated which converge to the actual values as the number of samples N grows. Specifically, the bidding engine derives the expected payoff for different capacity nominations for a given load combination. At this stage, all the uncertainties (e.g., load performance, weather, timing of events) are taken into account to yield a performance distribution for each given capacity nomination. The bidding engine is implemented as a Monte Carlo outer loop around the dispatch engine, which tests dispatch behavior by running many iterations for each capacity point. For each iteration, the bidding engine chooses a given event time and duration from the event distribution, along with a load drop for each flexible load from its model, and then runs the dispatch engine to obtain a load schedule. The bidding engine then evaluates that schedule based on the DR program rules. After many iterations, the results are collected into a graph that shows the distribution of payouts (over a DR season) for different capacity nominations for a given set of load combinations.

Figure 13:
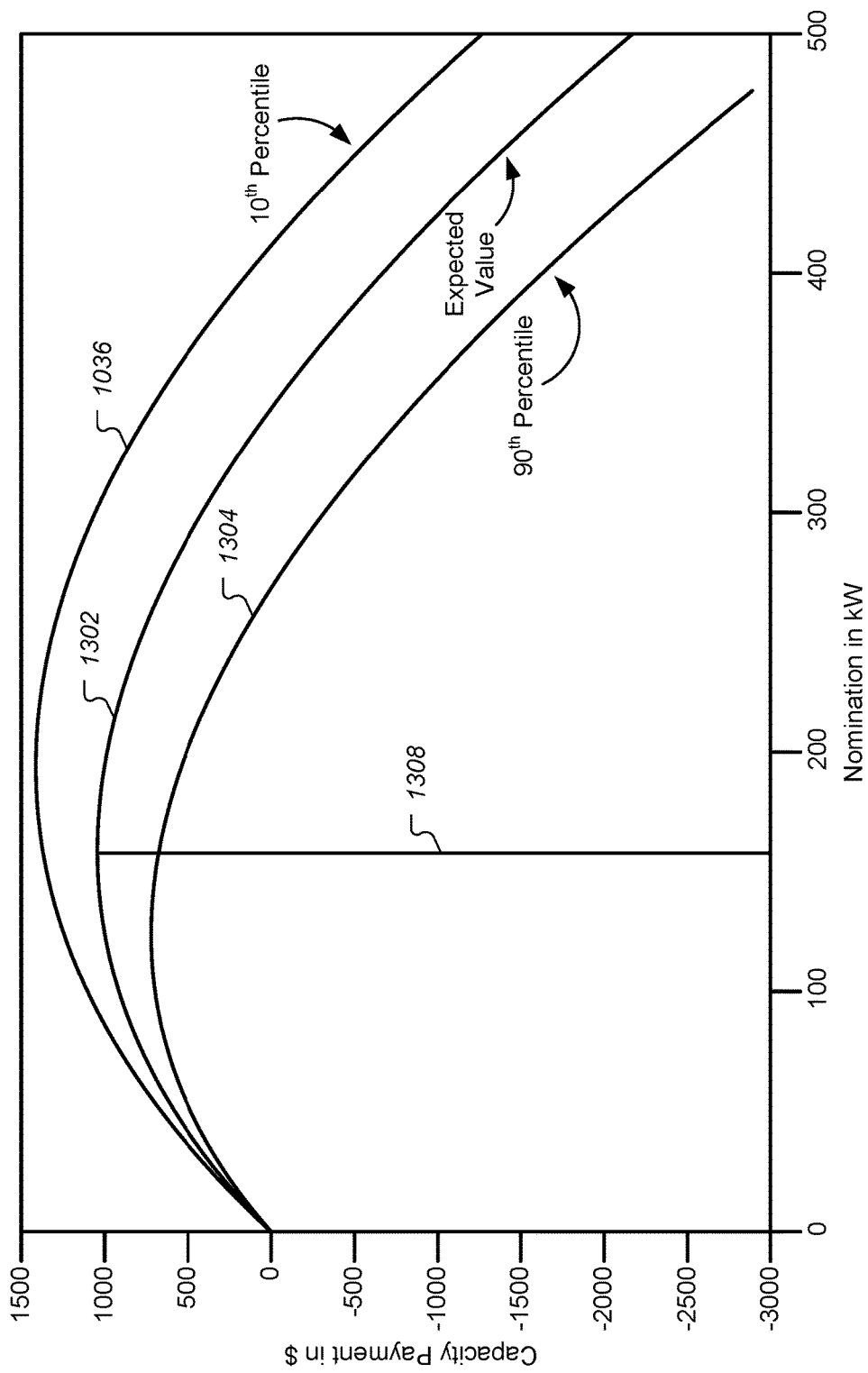
FIG. 13 illustrates an example set of curves, according to some embodiments.

FIG. 13 illustrates an example set of curves, according to some embodiments. Line 1302 captures the expected value of payout for each given capacity nomination for a given resource. But given that the payout is based on a number of uncertainties that are modelled, there is a certain distribution to the payout amount for each capacity. Line 1304 and line 1306 capture the 90th and 10th percentile of the payout, respectively. This is the payout amount that will be achieved in at least 90 and only 10 percent of the cases. There is a specific capacity value 1308 which maximizes the expected payout. To the left of this capacity value 1308 (i.e. for smaller capacity values) the expected payout is reduced, but the distribution width is also reduced. In other words, there is a risk/reward trade-off that can be made, with a lower expected value but also a higher 90th percentile.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

While the principles of the disclosure have been described above in connection with specific apparatuses and methods, it is to be clearly understood that this description is made only by way of example and not as limitation on the scope of the present teachings.

What is claimed is:

1. A thermostat management server comprising:
   one or more processors; and
   one or more memory devices comprising instructions that, when executed by the one or more processors, cause the one or more processors to perform operations comprising:
      receiving, from a plurality of thermostats, information that characterizes energy usage associated with the plurality of thermostats;
      receiving, from a utility provider computer system, parameters characterizing proposed future demand-response events;

selecting a combination of thermostats from the plurality of thermostats for which the energy usage can be reduced;
simulating a demand response event based on the parameters and using different weather conditions for the combination of the plurality of thermostats;
generating statistical probabilities of meeting a plurality of capacity reduction levels based on the different weather conditions;
selecting a capacity reduction level from the plurality of capacity reduction levels based on the statistical probabilities; and
sending the capacity reduction level to the utility provider computer system.

2. The thermostat management server of claim 1, wherein the parameters characterizing the proposed future demand-response events comprise a capacity reduction requirement.

3. The thermostat management server of claim 1, wherein the parameters characterizing the proposed future demand-response events comprise payout ratio vs. delivered-capacity ratio.

4. The thermostat management server of claim 1, wherein simulating the demand response event comprises using a plurality of Monte-Carlo simulations.

5. The thermostat management server of claim 1, wherein the one or more memory devices further comprise additional instructions that, when executed by the one or more processors, cause the one or more processors to perform additional operations comprising:
loading a dispatch engine to select the combination of thermostats from the plurality of thermostats for which the energy usage can be reduced.

6. The thermostat management server of claim 5, wherein the dispatch engine is configured to:
select the combination of thermostats from the plurality of thermostats for which the energy usage can be reduced;
determine whether an actual energy usage of the combination of thermostats meets the capacity reduction level; and
add or subtract thermostats from the combination of thermostats during successive time intervals to meet the capacity reduction level.

7. The thermostat management server of claim 1, wherein the information that characterizes the energy usage associated with the plurality of thermostats comprises HVAC capacities and thermal characteristics of associated buildings.

8. The thermostat management server of claim 1, wherein simulating the demand response event comprises compensating for simulation noise.

9. The thermostat management server of claim 1, wherein the statistical probabilities of meeting a plurality of capacity reduction levels comprises a plurality of probability curves, wherein the plurality of probability curves comprises an expected value curve, a $10^{th}$ percentile curve, and the $90^{th}$ percentile curve.

10. A method for responding to requests to fulfill future power capacity reductions, the method comprising:
receiving, from a plurality of thermostats, information that characterizes energy usage associated with the plurality of thermostats;
receiving, from a utility provider computer system, parameters characterizing proposed future demand-response events;
selecting, by a thermostat management server, a combination of thermostats from the plurality of thermostats for which the energy usage can be reduced;
simulating, by the thermostat management server, a demand response event based on the parameters and using different weather conditions for the combination of the plurality of thermostats;
generating, by the thermostat management server, statistical probabilities of meeting a plurality of capacity reduction levels based on the different weather conditions;
selecting, by the thermostat management server, a capacity reduction level from the plurality of capacity reduction levels based on the statistical probabilities; and
sending, by the thermostat management server, the capacity reduction level to the utility provider computer system.

11. The method of claim 10, wherein the parameters characterizing the proposed future demand-response events comprise payout ratio vs. delivered-capacity ratio.

12. The method of claim 10, wherein simulating the demand response event comprises using a plurality of Monte-Carlo simulations.

13. The method of claim 10, further comprising:
loading a dispatch engine to select the combination of thermostats from the plurality of thermostats for which the energy usage can be reduced.
selecting the combination of thermostats from the plurality of thermostats for which the energy usage can be reduced;
determining whether an actual energy usage of the combination of thermostats meets the capacity reduction level; and
adding or subtracting thermostats from the combination of thermostats during successive time intervals to meet the capacity reduction level.

14. The method of claim 10, wherein simulating the demand response event comprises compensating for simulation noise.

15. The method of claim 10, wherein the statistical probabilities of meeting a plurality of capacity reduction levels comprises a plurality of probability curves, wherein the plurality of probability curves comprises an expected value curve, a $10^{th}$ percentile curve, and the $90^{th}$ percentile curve.

16. A non-transitory, computer-readable medium comprising instructions that, when executed by one or more processors, cause the one or more processors to perform operations comprising:
receiving, from a plurality of thermostats, information that characterizes energy usage associated with the plurality of thermostats;
receiving, from a utility provider computer system, parameters characterizing proposed future demand-response events;
selecting a combination of thermostats from the plurality of thermostats for which the energy usage can be reduced;
simulating a demand response event based on the parameters and using different weather conditions for the combination of the plurality of thermostats;
generating statistical probabilities of meeting a plurality of capacity reduction levels based on the different weather conditions;
selecting a capacity reduction level from the plurality of capacity reduction levels based on the statistical probabilities; and
sending the capacity reduction level to the utility provider computer system.

17. The non-transitory, computer-readable medium of claim 16, wherein simulating the demand response event comprises using a plurality of Monte-Carlo simulations.

18. The non-transitory, computer-readable medium of claim 16, comprising additional instructions that cause the one or more processors to perform additional operations comprising:
- loading a dispatch engine to select the combination of thermostats from the plurality of thermostats for which the energy usage can be reduced.
- selecting the combination of thermostats from the plurality of thermostats for which the energy usage can be reduced;
- determining whether an actual energy usage of the combination of thermostats meets the capacity reduction level; and
- adding or subtracting thermostats from the combination of thermostats during successive time intervals to meet the capacity reduction level.

19. The non-transitory, computer-readable medium of claim 16, wherein simulating the demand response event comprises compensating for simulation noise.

20. The non-transitory, computer-readable medium of claim 16, wherein the statistical probabilities of meeting a plurality of capacity reduction levels comprises a plurality of probability curves, wherein the plurality of probability curves comprises an expected value curve, a $10^{th}$ percentile curve, and the $90^{th}$ percentile curve.

* * * * *